(12) United States Patent
Wadley et al.

(10) Patent No.: US 10,107,560 B2
(45) Date of Patent: Oct. 23, 2018

(54) MULTIFUNCTIONAL THERMAL MANAGEMENT SYSTEM AND RELATED METHOD

(75) Inventors: Haydn N. G. Wadley, Keswick, VA (US); Hossein Haj-Hariri, Charlottesville, VA (US); Frank Zok, Goleta, CA (US); Pamela M. Norris, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 558 days.

(21) Appl. No.: 13/522,264

(22) PCT Filed: Jan. 13, 2011

(86) PCT No.: PCT/US2011/021121
§ 371 (c)(1),
(2), (4) Date: Jul. 13, 2012

(87) PCT Pub. No.: WO2011/142841
PCT Pub. Date: Nov. 17, 2011

(65) Prior Publication Data
US 2013/0014916 A1    Jan. 17, 2013

Related U.S. Application Data

(60) Provisional application No. 61/295,112, filed on Jan. 14, 2010.

(51) Int. Cl.
*F24H 3/00*    (2006.01)
*F24D 19/02*    (2006.01)
(Continued)

(52) U.S. Cl.
CPC ............ *F28D 15/046* (2013.01); *E01C 11/26* (2013.01); *F28D 15/0275* (2013.01);
(Continued)

(58) Field of Classification Search
CPC .. F28D 15/02; F28D 15/0233; F28D 15/0275; F28D 15/04; F28D 15/046; F28D 20/02; F28F 2210/02; F28F 3/12
(Continued)

(56) References Cited

U.S. PATENT DOCUMENTS 3,364,991 A    1/1968    Wang
3,620,298 A    11/1971    Somerville
(Continued)

FOREIGN PATENT DOCUMENTS

WO    WO 2001/092001    12/2001
WO    WO 2002/006747    1/2002
(Continued)

OTHER PUBLICATIONS

ONR BAA Announcement No. 09-031, "Flight Deck Thermal Management", Department of the Navy Science & Technology, 26 pages.

*Primary Examiner* — Jason Thompson
(74) *Attorney, Agent, or Firm* — Robert J. Decker

(57) ABSTRACT

A system and related method that provides, but is not limited thereto, a thin structure with unique combination of thermal management and stress supporting properties. An advantage associated with the system and method includes, but is not limited thereto, the concept providing a multifunctional design that it is able to spread, store, and dissipate intense thermal fluxes while also being able to carry very high structural loads. An aspect associated with an approach may include, but is not limited thereto, a large area system for isothermalizing a localized heating source that has many applications. For example it can be used to mitigate the thermal buckling of ship deck plates, landing pad structures, or any other structures subjected to localized heating and compressive forces. It can also be used as a thermal regulation system in numerous applications, including but not
(Continued)

limited to under-floor heating for residential or commercial buildings or for the de-icing of roads, runways, tunnels, sidewalks, and bridge surfaces.

51 Claims, 20 Drawing Sheets

(51) Int. Cl.
| | |
|---|---|
| *F02M 31/08* | (2006.01) |
| *F24F 13/00* | (2006.01) |
| *F28D 15/04* | (2006.01) |
| *E01C 11/26* | (2006.01) |
| *F28D 15/02* | (2006.01) |
| *F28D 20/02* | (2006.01) |

(52) U.S. Cl.
CPC ............ *F28D 20/02* (2013.01); *Y02E 60/145* (2013.01); *Y10T 29/49353* (2015.01)

(58) Field of Classification Search
USPC .................... 165/47, 49, 104.21, 53, 135
See application file for complete search history.

(56) References Cited

U.S. PATENT DOCUMENTS

| | | | |
|---|---|---|---|
| 3,626,149 A * | 12/1971 | Carney | E01C 7/145 |
| | | | 106/717 |
| 3,645,478 A | 2/1972 | Madelung | |
| 3,658,125 A | 4/1972 | Freggens | |
| 3,782,132 A * | 1/1974 | Lohoff | 62/260 |
| 3,936,209 A * | 2/1976 | Krage | 404/75 |
| 4,007,777 A | 2/1977 | Sun | |
| 4,015,659 A | 4/1977 | Schladitz | |
| 4,020,898 A | 5/1977 | Grover | |
| 4,129,177 A * | 12/1978 | Adcock | 165/48.2 |
| 4,164,933 A * | 8/1979 | Alosi | 126/621 |
| 4,170,262 A | 10/1979 | Marcus | |
| 4,184,477 A | 1/1980 | Yuan | |
| 4,196,504 A | 4/1980 | Eastman | |
| 4,201,193 A * | 5/1980 | Ronc | 126/623 |
| 4,478,277 A * | 10/1984 | Friedman et al. | 165/185 |
| 4,478,784 A | 10/1984 | Burelbach | |
| 4,482,111 A * | 11/1984 | Le Touche | 244/117 A |
| 4,527,545 A | 7/1985 | Bertels | |
| 4,566,527 A * | 1/1986 | Pell et al. | 165/45 |
| 4,756,976 A | 7/1988 | Komeya | |
| 4,884,627 A * | 12/1989 | Abtahi | 165/104.26 |
| 5,080,977 A | 1/1992 | Zaplatynsky | |
| 5,178,485 A * | 1/1993 | Katsuragi et al. | 404/95 |
| 5,195,575 A | 3/1993 | Wylie | |
| 5,509,472 A * | 4/1996 | Tamura et al. | 165/171 |
| 5,579,830 A | 12/1996 | Giammaruti | |
| 5,697,428 A * | 12/1997 | Akachi | 165/104.21 |
| 5,800,905 A | 9/1998 | Sheridan | |
| 6,110,604 A | 8/2000 | Rickerby | |
| 6,116,330 A * | 9/2000 | Salyer | 165/48.2 |
| 6,167,948 B1 | 1/2001 | Thomas | |
| 6,319,614 B1 | 11/2001 | Beele | |
| 6,387,526 B1 | 5/2002 | Beele | |
| 6,406,140 B1 | 6/2002 | Wotton | |
| 6,446,706 B1 | 9/2002 | Rosenfeld | |
| 6,575,113 B1 | 6/2003 | Fischer | |
| 6,688,381 B2 * | 2/2004 | Pence et al. | 165/168 |
| 6,725,910 B2 | 4/2004 | Ishida | |
| 6,885,836 B2 | 4/2005 | Kimura | |
| 6,976,532 B2 | 12/2005 | Zhan | |
| 7,193,850 B2 | 3/2007 | Pal | |
| 7,211,348 B2 | 5/2007 | Wadley | |
| 7,292,441 B2 | 11/2007 | Smalc | |
| 7,401,643 B2 | 7/2008 | Queheillalt | |
| 7,424,967 B2 | 9/2008 | Ervin | |
| 7,507,288 B1 | 3/2009 | Sambasivan | |
| 7,963,085 B2 | 6/2011 | Sypeck | |
| 8,247,333 B2 | 8/2012 | Sypeck | |
| 8,650,756 B2 | 2/2014 | Wadley | |
| 2002/0110682 A1 * | 8/2002 | Brogan | 428/325 |
| 2002/0166658 A1 | 11/2002 | Norley | |
| 2002/0166660 A1 | 11/2002 | Norley | |
| 2003/0094266 A1 | 5/2003 | Fritsch | |
| 2003/0230399 A1 * | 12/2003 | Hurlbert et al. | 165/104.25 |
| 2004/0123980 A1 * | 7/2004 | Queheillalt et al. | 165/133 |
| 2005/0006365 A1 | 1/2005 | Kooken | |
| 2005/0202206 A1 | 9/2005 | Wadley | |
| 2006/0080835 A1 | 4/2006 | Kooistra | |
| 2007/0227704 A1 * | 10/2007 | Nagai | F28D 15/0233 |
| | | | 165/104.33 |
| 2007/0259211 A1 | 11/2007 | Wang | |
| 2007/0269716 A1 | 11/2007 | Wadley | |
| 2008/0115916 A1 * | 5/2008 | Schuette | F28F 3/06 |
| | | | 165/104.33 |
| 2008/0135212 A1 | 6/2008 | Queheillalt | |
| 2008/0185128 A1 | 8/2008 | Moon | |
| 2009/0190290 A1 | 7/2009 | Lynch | |
| 2009/0274865 A1 | 11/2009 | Wadley | |

FOREIGN PATENT DOCUMENTS

| | | |
|---|---|---|
| WO | WO 2002/015300 | 2/2002 |
| WO | WO 2002/098644 | 12/2002 |
| WO | WO 2003/101721 | 12/2003 |
| WO | WO 2004/011245 | 2/2004 |
| WO | WO 2004/022868 | 3/2004 |
| WO | WO 2004/022869 | 3/2004 |
| WO | WO 2005/014216 | 2/2005 |
| WO | WO 2007/139814 | 12/2007 |
| WO | WO 2007139814 A2 * | 12/2007 |
| WO | WO 2008/127301 | 10/2008 |
| WO | WO 2008/131105 | 10/2008 |
| WO | WO 2008131105 A1 * | 10/2008 |
| WO | WO 2009/061539 | 5/2009 |
| WO | WO 2009/105651 | 8/2009 |
| WO | WO 2010/082970 | 7/2010 |

* cited by examiner

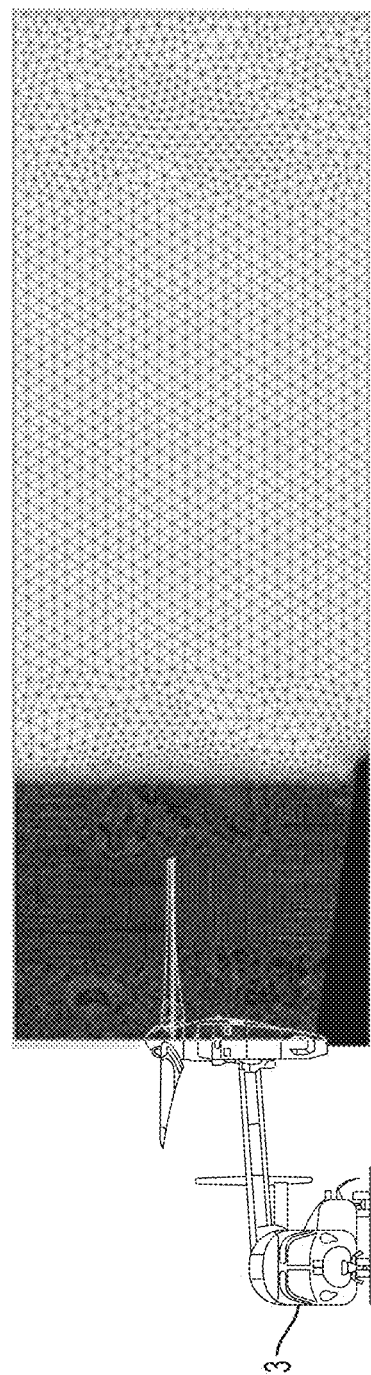

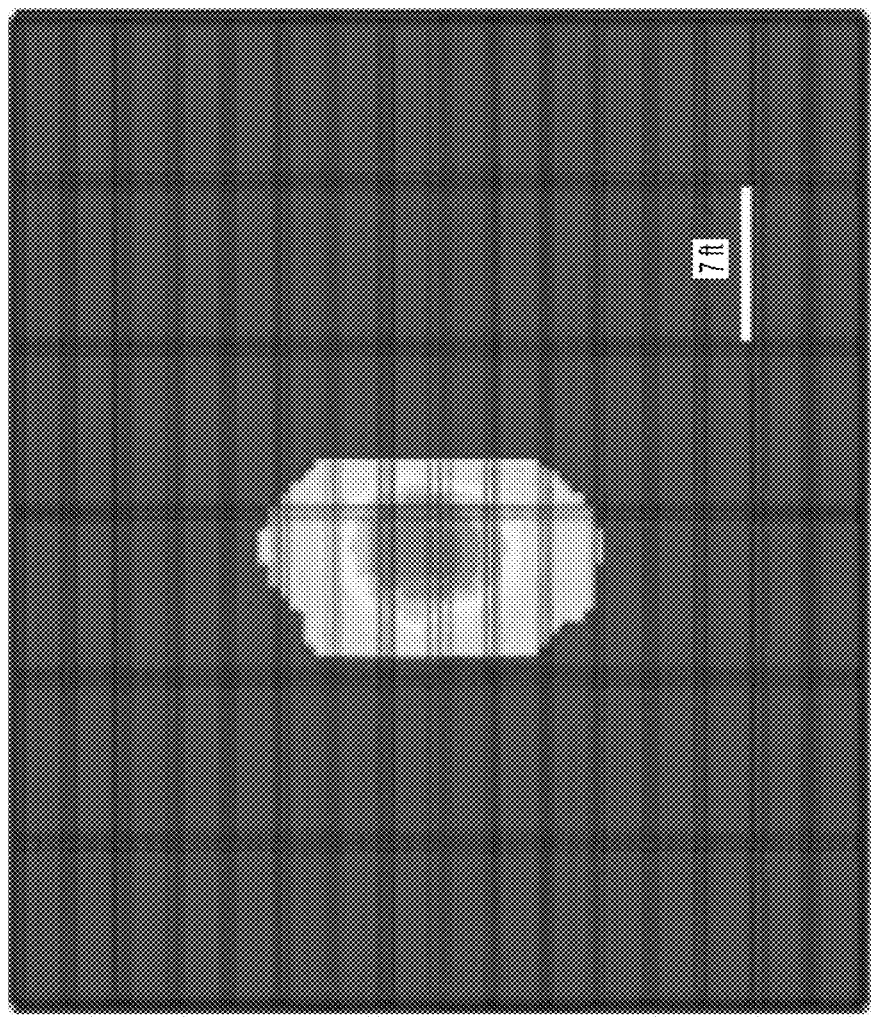
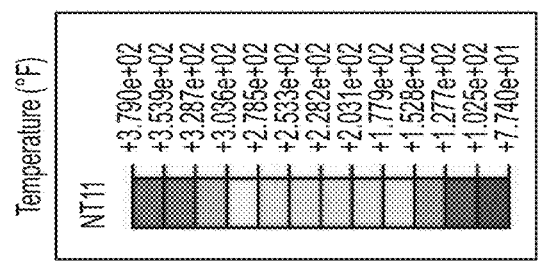
FIG. 7

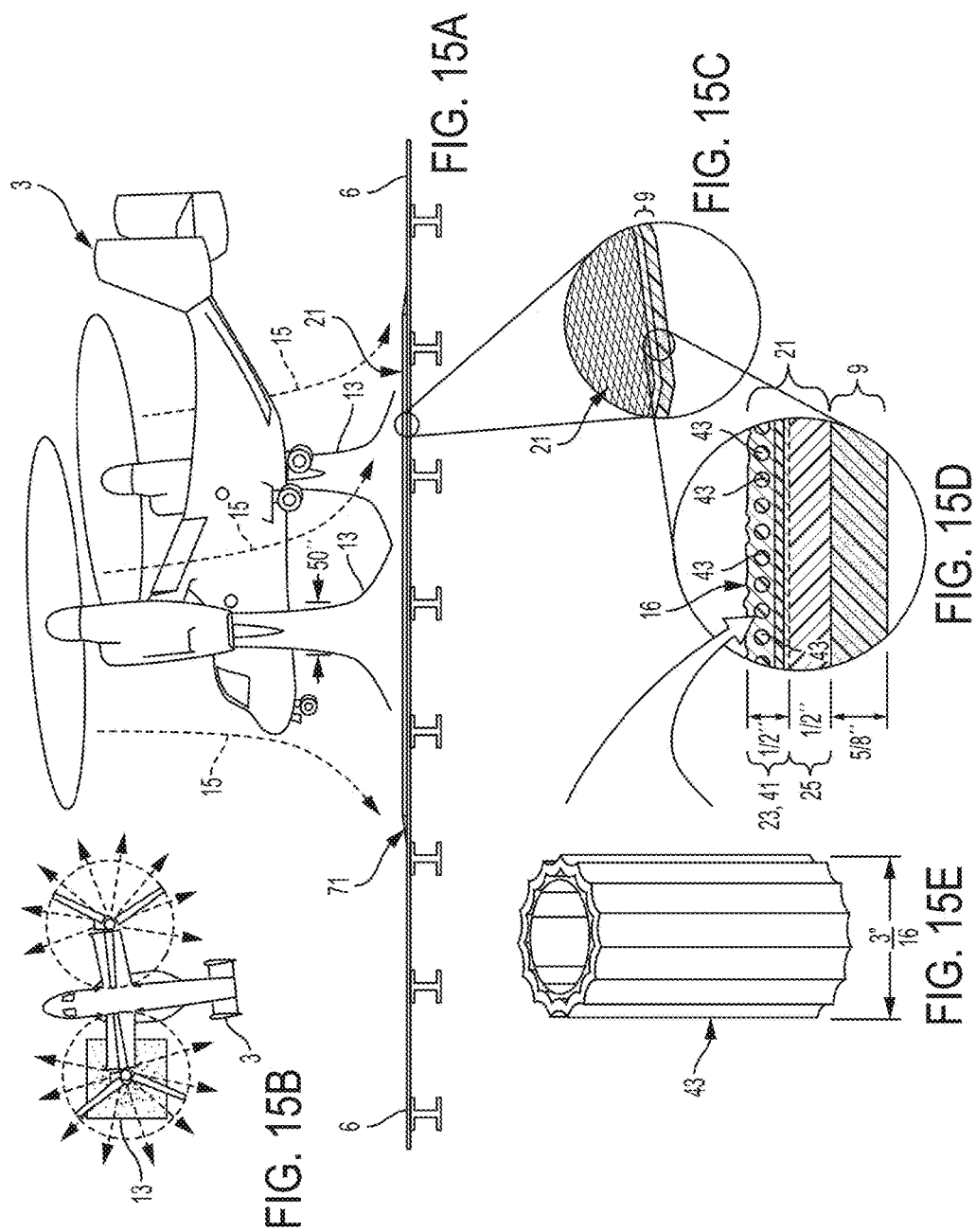

MULTIFUNCTIONAL THERMAL MANAGEMENT SYSTEM AND RELATED METHOD

RELATED APPLICATIONS

The present application is a national stage filing of International Application No. PCT/US2011/021121, filed 13 Jan. 2011, which claims priority under 35 U.S.C. § 119(e) from U.S. Provisional Application Ser. No. 61/295,112, filed Jan. 14, 2010, entitled "A Multifunctional Heat Pipe Solution to Plate Thermal Buckling and Related Method," the disclosures of which are hereby incorporated by reference herein in their entirety.

FIELD OF THE INVENTION

The present invention relates generally to the field of thermal management. More specifically, the present invention also relates to thermal conduction, heat capacity, heat pipe systems, and phase change materials.

BACKGROUND OF THE INVENTION

Amphibious Assault Ships support US Marine Corps expeditionary forces for extended periods of time. They in some ways resemble small aircraft carriers and are capable of supporting both Marine air and rotorcraft and a variety of amphibious vehicles. The landing helicopter deck (LHD) class of multipurpose amphibious assault ship was designed to facilitate the use of the AV-8B Harrier, Landing Craft Air Cushion (LCAC) hovercraft, and the full range of Navy and Marine Corps helicopters, landing craft and amphibious assault vehicles. The landing helicopter assault replacement (LHA®) amphibious assault ship meets future Navy-Marine Corps requirements and is able to support the expanded capability of 21st century expeditionary strike platforms such as the Marine variant of the V-22 Osprey helicopter and the F-35B Joint Strike Fighter airplane. The F-35B is capable of short runway take-off and vertical landing (STOVL).

The flight decks of the LHD and LHA class ships that accommodate a variety of air craft have nine landing spots; six port and three starboard. Legacy helicopter and AV-8B flight operations have been conducted effectively for many years from these ships. However, the introduction of the MV-22 has to these amphibious assault ships has resulted in flight deck warping during flight operations. During MV-22 ship integration tests aboard the USS Iwo Jima (LHD 7) in June 2004, there were reports of excessive heating and large deflections of the flight deck in the vicinity of the aircraft's right nacelle. The USS Bataan (LHD 5) also reported similar events in which excessive heating and large deflections of the flight deck were observed during V-22 ship integration tests in July 2005. The deflections were reported to occur while the aircraft was sitting on the deck turning rotors and began to appear after approximately 10 minutes of aircraft operation. Once the engines were turned off, or the aircraft launched, it appeared to take several hours for the deck to return to its "original" shape. Other items of concern noted from these reports include the discoloring of the flight deck non-skid coating, discoloring of the paint and primer on the underside of the deck plate, and charring of the overhead insulation. Subsequent Navy assessments of the thermal loads imposed by the landing of the F-35B Joint Strike Fighter on these ships indicated unacceptably severe heating of the deck and its (organic base) nonskid coating during landing.

The hot engine exhaust of both MV-22 Osprey and the F-35B is directed onto the horizontal deck surface, thereby subjecting the deck plate surface to higher than normal temperatures. Because the localized region of heating (and plate expansion) is surrounded by unheated deck plate and is welded to a deck support structure (longitudinal and transverse stiffening beams), the mechanically constrained thermal expansion is accommodated by deck plate buckling. This buckling occurs at a critical buckling stress established by the deck plate thickness and elastic modulus and by its support conditions. This buckling stress results in significant forces applied to the welds between the deck plate and the support structure. Initial calculations by Davis et al. (See Edward L. Davis, Young C. Hwang and David P. Kihl, "Structural Evaluation of an LHD-Class Amphibious Ship Flight Deck Subjected to Exhaust Gas Heat from a MV-22 Osprey Aircraft" NSWCCD-65-TR-2006/12 Mar. 2006) indicate that the forces are sufficient to cause local plastic deformation which is likely to result in fatigue failure of the deck before the ship reaches its design life.

In a related previous effort, the Applicant designed a passive approach for jet blast deflection during launch operations aboard aircraft carriers which demonstrated the ability to eliminate seawater-cooling systems for jet blast deflectors, reducing maintenance and maintaining the existing time period between launches. See International Application No. PCT/US2007/012268 entitled "Method and Apparatus for Jet Blast Deflection," filed May 23, 2007, and U.S. patent application Ser. No. 12/301,916 filed Nov. 21, 2008, entitled "Method and Apparatus for Jet Blast Deflection," of which are hereby incorporated by reference herein in their entirety.

The flight deck of the LHD(A) class of ships is 9/16" thick and made of HY 100 steel. It is primed and then coated with an epoxy based non-skid coating that is gradually degraded during a deployment. The coating is therefore designed to be easily removed and a new coating reapplied during routine overhaul of the ship. Impingement of the high temperature MV-22 and F-35B engine plumes upon this coating is likely to result in its rapid degradation during flight operations and so a new high temperature nonskid coating is required. Atmospheric pressure thermal spray coating concepts can apply coatings directly onto the deck surface, making this a promising approach for high temperature nonskid coating material application. However, these coatings are susceptible to delamination during severe thermal cyclic loading and have low strengths.

Heretofore the prior art has failed to be able to adequately dissipate or protect the ship decks from the exhaust of high temperature plumes of jet craft.

Moreover, regarding buildings, structures and housings, the prior art has failed to be able to efficiently minimize or contain the additional energy expenditure necessary to transfer heat or cooling to intended areas of the buildings, structures, housings or areas. Existing heating and cooling systems for buildings, structures, and housing are also structurally parasitic, since they require architectural accommodation to provide the necessary space and support.

SUMMARY OF THE INVENTION

An aspect of an embodiment of the present invention provides for, but is not limited thereto, the design of thin (in some instances less than about one inch thick, for example)

thermal management systems (TMS). The solutions may utilize various high thermal conductivity materials, heat pipes, and heat plate concepts to facilitate the storage, transport and eventual dissipation of the thermal energy using designs that are able to withstand very high localized compressive loads. The heat plate concepts can be combined with thermal insulation layers and coated with spray-deposited nonskid coatings capable of providing high-coefficient-of-friction surfaces. These systems could be used to protect surfaces that are subject to high localized thermal and compressive forces, such as landing pads and ship decks, or to facilitate improved thermal regulation systems in applications such as under-floor heating and road de-icing.

A system and related method that provides, but is not limited thereto, a thin structure with unique combination of thermal management and stress supporting properties. An advantage associated with the system and method includes, but is not limited thereto, the concept providing a multi-functional design that it is able to spread, store, and dissipate intense thermal fluxes while also being able to carry very high structural loads. An aspect associated with an approach may include, but is not limited thereto, a large area system for isothermalizing a localized heating source that has many applications. For example it can be used to mitigate the thermal buckling of ship deck plates, landing pad structures, or any other structures subjected to localized heating and compressive forces. It can also be used as a thermal regulation system in numerous applications, including but not limited to under-floor heating for residential or commercial buildings or for the de-icing of roads, runways, tunnels, sidewalks, and bridge surfaces. If can be applicable to walls, roofs, ceilings, or framing/infrastructure of a building or structure as well.

An aspect of an embodiment of the present invention provides an anisotropic thermal management system. The system may comprise: a high thermal conductivity layer to increase in-plane heat spreading across the high thermal conductivity layer; a low thermal conductivity layer to reduce heat transfer in the direction orthogonal to the low thermal conductivity layer; and wherein the system protects a load-bearing surface, structure, or component that is proximal to the low thermal conductivity layer, and distal from the high thermal conductivity layer, from excessive heat applied to the high thermal conductivity layer.

An aspect of an embodiment of the present invention provides an anisotropic thermal management system. The system may comprise: a high thermal conductivity layer to increase in-plane heat spreading across the high thermal conductivity layer; a low thermal conductivity layer to reduce heat transfer in the direction orthogonal to the low thermal conductivity layer and distal from the high thermal conductivity layer; and a localized heating element, cooling element, or both in communication with the high thermal conductivity layer. The system facilitates temperature regulation of the region proximal to the high thermal conductivity layer and distal to the low thermal conductivity layer; and wherein at least a portion of the system a) acts as a load-bearing surface, structure, or component and/or b) is in communication with a load-bearing surface, structure, or component that is proximal to the low thermal conductivity layer, and distal from the high thermal conductivity layer.

An aspect of an embodiment of the present invention provides a thermal management method for protecting a load-bearing surface, structure, or component. The method may comprise: providing a high thermal conductivity layer to increase in-plane heat spreading across the high thermal conductivity layer; and providing a low thermal conductivity layer to reduce heat transfer in the direction orthogonal to the low thermal conductivity layer. The method protects the load-bearing surface, structure, or component that is proximal to the low thermal conductivity layer, and distal from the high thermal conductivity layer, from excessive heat applied to the high thermal conductivity layer.

An aspect of an embodiment of the present invention provides a method for facilitating temperature regulation of a region proximal to a high thermal conductivity layer and distal to a low thermal conductivity layer. The method may comprise: providing the high thermal conductivity layer to increase in-plane heat spreading across the high thermal conductivity layer; providing the low thermal conductivity layer to reduce heat transfer in the direction orthogonal to the low thermal conductivity layer and distal from the high thermal conductivity layer; and providing a localized heating element, cooling element, or both in communication with the high thermal conductivity layer. A portion of the high thermal conductivity layer and/or low thermal conductivity layer: a) acts as a load-bearing surface, structure, or component and/or b) is in communication with a load-bearing surface, structure, or component that is proximal to the low thermal conductivity layer, and distal from the high thermal conductivity layer.

An aspect of an embodiment of the present invention provides a method of manufacturing any of the systems or subsystems disclosed herein.

These and other objects, along with advantages and features of various aspects of embodiments of the invention disclosed herein, will be made more apparent from the description, drawings and claims that follow.

BRIEF DESCRIPTION OF THE DRAWINGS

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

FIG. 4 is a schematic illustration showing a front view of the V22 Osprey aircraft and a mesh employed for computational fluid dynamics calculations for the Osprey's exhaust plume and downwash.

FIG. 7 is a graphical plot showing a map of measured temperature distribution on a deck surface. See Edward L. Davis, Young C. Hwang and David P. Kihl, "Structural Evaluation of an LHD-Class Amphibious Ship Flight Deck Subjected to Exhaust Gas Heat from a MV-22 Osprey Aircraft" NSWCCD-65-TR-2006/12 Mar. 2006.

FIG. 15A is a schematic illustration showing a side view of an Osprey aircraft and a TMS. FIG. 15B is a schematic illustration showing a top view of the Osprey. FIG. 15C is a schematic illustration showing an enlarged partial view of a TMS of FIG. 15A. FIG. 15D is a schematic illustration showing an enlarged partial cross-sectional view of a TMS of FIG. 15C utilizing heat pipes disposed in a non-skid coating. FIG. 15E is an enlarged schematic perspective illustration of a heat pipe segment of a heat pipe of FIG. 15D.

FIG. 16 is a schematic illustration of a TMS incorporating a heat pipe system with radially-arranged, arterial heat pipes.

The foregoing and other objects, features and advantages of the present invention, as well as the invention itself, will be more fully understood from the following description of preferred embodiments, when read together with the accompanying drawings.

DETAILED DESCRIPTION OF EXEMPLARY EMBODIMENTS

Figure 1:
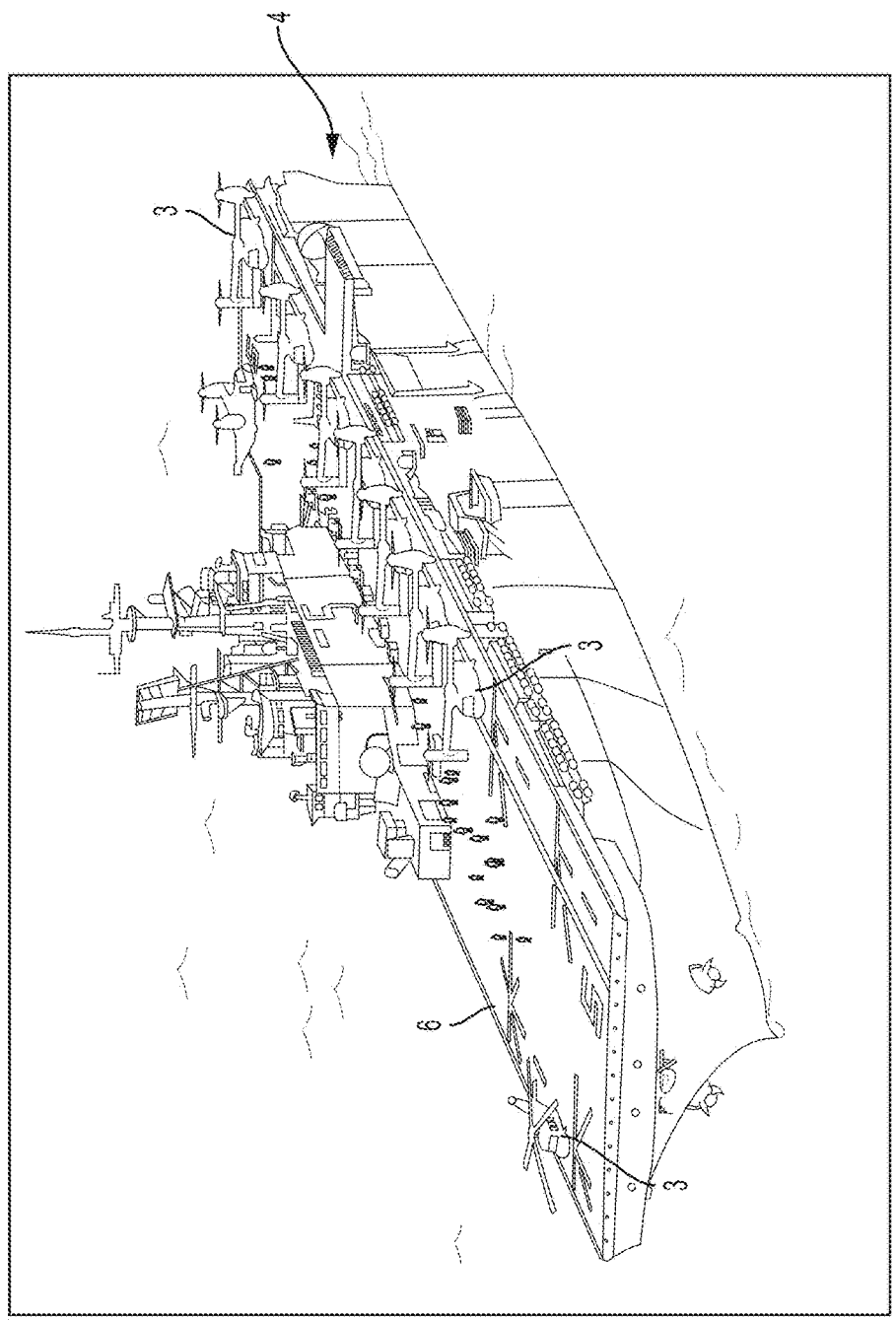
FIG. 1 is a photographic depiction of an aircraft carrier.

An embodiment of the present invention provides, but is not limited thereto, a thin structure with a unique combination of thermal management and stress-supporting properties. An advantage associated with an embodiment of the present invention includes, but is not limited thereto, the concept providing a multifunctional design enabling it to spread, store, and dissipate intense thermal fluxes while also being able to carry very high structural loads. An aspect associated with an embodiment of the present invention includes, but is not limited thereto, a large area system for isothermalizing a localized heating source that has many applications. For example, it can be used to mitigate the thermal buckling of ship deck plates, landing pad structures, or any other structures subjected to excessive localized heating. It can also be used as an under-floor heating system for residential or commercial buildings; for the de-icing of structures such as roads, runways, tunnels, bridge surfaces, and sidewalks; and in many other applications. For instance, applications may include, but not limited thereto, under-floor heating for residential or commercial buildings or for the de-icing of roads, runways, tunnels, sidewalks, and bridge surfaces. If can be applicable to walls, roofs, ceilings, or framing/infrastructure of a building or structure as well. The system may be adapted for heating or cooling, or both as desired or required. FIG. 1 illustrates one such potential application. This figure shows a typical aircraft carrier 4, having a flight deck 6, used for the take-off and landing of aircraft 3. It should be appreciated that the illustrated aircraft carrier, aircraft, and flight deck are mere examples of certain aspects of an embodiment of the invention and in no way serve as limitations.

An aspect of an embodiment of the thermal management system (TMS) may include a heat pipe system that consists of a series of heat pipes or heat pipe channels supported on an insulating foundation that is bonded—adhesively or by some other mode of attaching, connecting or bonding—to a load-bearing surface. Further, the region directly above the load bearing surface may be composed of a low thermal conductivity layer that reduces through-plane transfer of thermal energy; such layer also being in communication with a high thermal conductivity layer on the side distal to the load-bearing surface.

It should be appreciated that the term "heat pipe channel" is used to merely to suggest subtly different characterizations of the heat pipe structure. "Heat pipe" is used as a general means of describing a heat transfer mechanism that combines the principles of both thermal conductivity and phase transition to efficiently manage the transfer of heat. "Heat pipe channel" is not intended to describe a structure that is distinct from a "heat pipe," but merely describes a situation in which the heat pipe structure is conceived of as being formed from spaces, or "channels," that exist in the surrounding material; as opposed to being formed by interposing a distinct conduit within another material, said conduit being capable of meaningfully existing separate from the surrounding material. It should be appreciated that most if not all heat pipe structures described herein could be implemented in such a way as to be considered "heat pipe channels," regardless of whether they are explicitly called out as being heat pipe channels. Those applications which explicitly identify the possibility of using heat pipe channels are in no way meant to limit other applications in which "heat pipe channels" are not explicitly mentioned.

It should also be appreciated that the use of the term "above"—and any other directional cues used herein, such as "underlying,"—are meant merely to convey the relative positions of the layers and are not meant to limit any embodiment of the invention to any particular orientation. The load-bearing surface may be oriented in any direction, may be of any shape or size, and may have heat and compression forces impinging upon it from any direction. These directional cues merely suggest that, in these embodiments of the present invention, the TMS is situated between this thermal source and the protected surface; that is, the directional cues describe the position of TMS elements relative to each other, not relative to the earth's surface or any other reference point.

An aspect of an embodiment of the invention achieves its anisotropic thermal properties by utilizing the two-layer approach described above. The high thermal conductivity layer facilitates in-plane heat spreading from the localized heat source, while the underlying low thermal conductivity reduces through-plane heat spreading. Another aspect of an embodiment of the invention may utilize a high heat capacity design—for example, by incorporating phase change materials—to improve the thermal storage capacity of the system.

Moreover, referring generally to FIG. 2, the various embodiments of the present invention may also be utilized in a wide variety of heating and cooling applications. Commonly used heating and cooling systems such as air ducts and vents are parasitic insofar as they take up valuable space in the construction of buildings and are often incapable of structurally supporting themselves against significant loads. Furthermore, these and other heating systems require additional energy expenditure to transfer heat from the heating element to the regulated area (e.g., running fans to move hot air through air ducts). The regulated area may also be heated (or cooled) unevenly as the heated (or cooled) air is pumped in from one particular region, or as a localized heating element is applied to one particular region of the area.

The various embodiments of the present invention address each of these problems. First, by being capable of supporting significant loads, the TMS requires no additional protective structures. The TMS also allows for the more efficient usage of space in the design of various buildings and structures, since the designs no longer have to allow for the aforementioned parasitic usage of space by other heating and cooling structures. Furthermore, due to the TMS's ability to passively transfer heat, no additional power inputs are required to transfer heat from the heating and cooling elements to other areas. Finally, the isothermal properties of the TMS allow for even heating and cooling of the regulated area, as localized thermal input is spread evenly throughout the high thermal conductivity layer.

In these thermal-regulation embodiments, the TMS operates not simply to protect an underlying surface from a localized heat source, but to efficiently regulate the temperature of an adjoining area that is adjacent to the high thermal conductivity layer on the side distal from the low thermal conductivity layer. In these embodiments, the anisotropic thermal properties of the TMS operate to promote thermal transfer between the TMS and the region adjacent to the high thermal conductivity layer, distal to the low thermal conductivity layer; while reducing thermal transfer between the TMS and the region adjacent to the low thermal conductivity layer, distal to the high thermal conductivity layer.

Figure 2A:
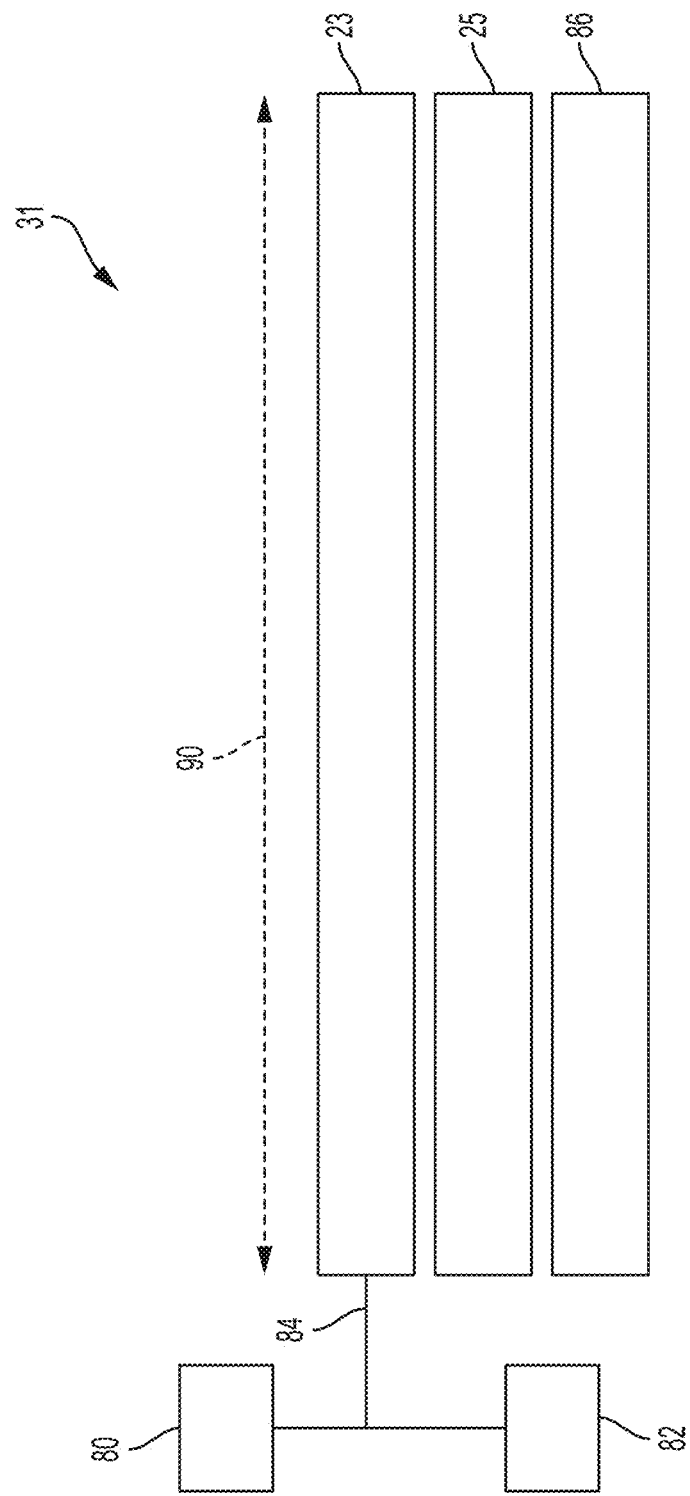
FIG. 2A is a schematic illustration of a TMS in communication with an underlying load-bearing structure and thermally connected to a localized heating and/or cooling element.

FIG. 2A shows a generic schematic of one such aspect of an embodiment of the invention wherein the TMS 31 contains a high thermal conductivity layer 23 that is connected via thermal interconnection 84 to a localized heating element 80 and/or a localized cooling element 82. The high thermal conductivity layer 23 also communicates with a low thermal conductivity layer 25, which further communicates with (e.g., covers or connects with) the underlying load-bearing surface 86. It should be appreciated that this underlying load-bearing surface 86 may be a floor, wall, ceiling, beam, truss, or other structural component or surface of a building, vehicle, ship, trailer, aircraft, watercraft, container, electronic housing, machinery housing, tank, pool, swimming pool, reservoir, roadway, runways, tunnels, or other structure. This TMS system regulates the temperature of the adjoining area 90. It should be appreciated that the adjoining area could be gas, liquid, or solid and may be of any shape, size, or dimensions.

Figure 2B:
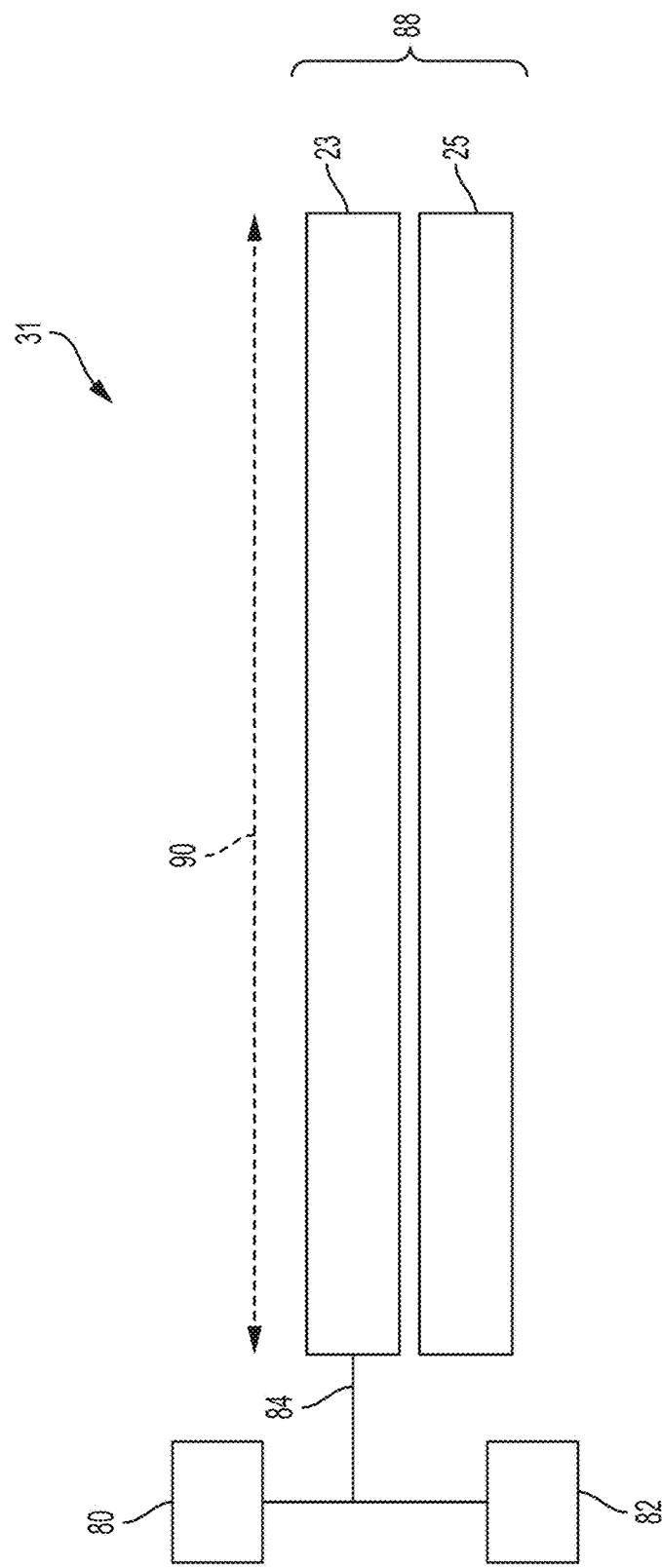
FIG. 2B is a schematic illustration of a TMS thermally connected to a localized heating and/or cooling element, whereby at least a portion of the TMS serves as a load-bearing structure.

FIG. 2B shows another aspect of an embodiment of the invention wherein the temperature regulating the TMS 31 contains a high thermal conductivity layer 23 that is connected via thermal interconnection 84 to a localized heating element 80 and/or a localized cooling element 82. The high thermal conductivity layer 23 also communicates with the low thermal conductivity layer 25. In this example, rather than communicating with (e.g., covering or connecting with) a load-bearing surface, the TMS itself—or at least portions thereof—operate as the ultimate load-bearing structure 88. In such an embodiment the TMS would itself act as a floor, wall, ceiling, beam, truss, or other structural component or surface of a building, vehicle, ship, trailer, aircraft, watercraft, spacecraft, container, electronic housing, machinery housing, tank, pool, swimming pool, reservoir, or other structure. This TMS system regulates the temperature of the adjoining area 90.

Optionally, both concepts illustrated in FIGS. 2A and 2B may be combined whereby the TMS may function so as to (a) communicate with (e.g., cover or connect with) a load-bearing surface and (b) itself operate (or at least portions thereof) as the ultimate load-bearing structure 88.

Still referring to FIG. 2, another aspect of an embodiment of the invention may utilize solar energy or wind energy. In such embodiments, the localized heating and/or cooling elements may incorporate means capable of utilizing solar energy or wind energy. Another aspect of an embodiment of the invention may utilize geothermal means for temperature regulation. In such embodiments the localized heating and/or cooling elements may incorporate thermal interconnection with the earth or a structure, device, system, or region located within the earth's surface.

Figure 3:
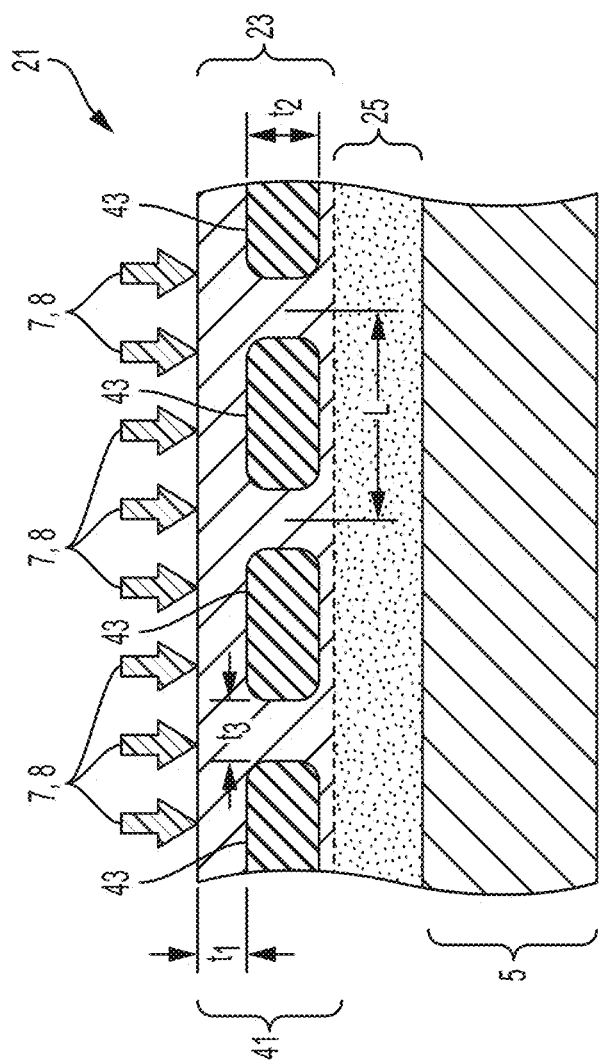
FIG. 3 is a schematic illustration of an anisotropic thermal management system utilizing a heat pipe system as its high thermal conductivity layer.

Next, FIG. 3 shows a schematic illustration of an aspect of an embodiment of the present invention. The TMS 21 contains a high thermal conductivity layer 23, which in this depiction is a heat pipe system 41 containing multiples heat pipes 43. Heat 7 and pressure 8 are shown being applied to high thermal conductivity layer 23 on the side distal to the low thermal conductivity layer 25, which is also in communication with an underlying load-bearing surface 5. It should be appreciated that FIG. 3 serves merely as an example of one embodiment of a TMS, and the specific depictions and dimensions therein do not serve as limitations; these layers and the heat pipe system 41 may be implemented in a number of different ways. It should also be appreciated that the high thermal conductivity layer is not limited to heat pipe systems, and could also be composed of other high thermal conductivity materials such as a uniform high thermal conductivity material (e.g., aluminum, silver, copper, diamond, or graphite or other materials with a thermal conductivity greater than about 10 W/mK), a non-uniform high thermal conductivity material, a composite formed from a multiplicity of high thermal conductivity materials, or any combination of these elements and a heat pipe system. Furthermore, the high conductivity layer, low conductivity layer, or both may also incorporate one or more phase change materials including, but not limited to, paraffins, fatty acids, and hydrated salts.

The anisotropic thermal management system (TMS) according to the present invention is for thermally protecting a load-bearing surface, structure, or component against heat 7 being transferred from a heat source to the load-bearing surface, structure, or component. The anisotropic thermal management system comprises the high thermal conductivity layer 23 comprising a high thermal conductivity material. The high thermal conductivity layer 23 providing in-plane heat spreading across the high thermal conductivity layer 23. The high thermal conductivity material is an alloy of aluminum, silver, copper, diamond, graphite, or other material with a thermal conductivity greater than about 10 W/mK. The high thermal conductivity layer 23 having a flat layer structure with uniform thickness. The high thermal conductivity layer 23 further comprising the heat pipe system 41 having the multiple heat pipes 43 or heat pipe channels located within the thickness of the high thermal conductivity layer 23 and entirely surrounded and enclosed within the high thermal conductivity layer 23. The low thermal conductivity layer 25 comprising a low thermal conductivity material. The low thermal conductivity layer 25 reducing heat transfer from the heat source through the high thermal conductivity layer 23 and the low thermal conductivity layer 25 to the load-bearing surface, structure, or component. The low thermal conductivity material comprises at least one of the following materials: aramid, polymer, polymer foams, wood, plaster, cement, concrete or any other material or porous structure with a thermal conductivity less than about 1 W/mK. The anisotropic thermal management system (TMS) is configured to be installed or located between the heat source and load-bearing surface, structure, or component to thermally protect and reduce heat transfer from the heat source to the load-bearing surface, structure, or component, The low thermal conductivity layer 25 is disposed atop the load-bearing surface, structure, or component. The high thermal conductivity layer 23 is disposed atop the low thermal conductive layer. The heat source is located atop and facing the high thermal conductivity layer.

It should also be noted that the low thermal conductivity layer is not limited to specific constructions, materials, or dimensions in any embodiment of the invention. All implementations of this layer discussed in specific embodiments herein could be substituted for other implementations. This layer can be constructed in many different ways from many different materials and combinations thereof. For example, this layer could be implemented using a uniform, low thermal conductivity material; a non-uniform high thermal conductivity material; or a composite formed from a multiplicity of high thermal conductivity materials. At least a portion of this layer may also contain porous structures that may be filled with other substances such as air, aerogels, foams, or other insulating substances; and it may contain other spaces interspersed throughout.

The bonding of any particular layer to another may also be accomplished by various means. For example, the high thermal conductivity layer and low thermal conductivity layer may be adjoined using mechanical attachments, adhesives, mechanical bonding, welding, brazing, soldering, chemical bonding or reaction, or any other suitable means.

Several design considerations must be addressed for embodiments that incorporate heat pipes. First, the selection of the pipe geometry, the type and volume of wick material, the type and volume of the working fluid, and the volume fraction of the heat pipe system in conjunction with the thermal inputs and outputs (cooling strategy) will establish the operating temperature range of the system. The heat transport process and fluid flow in the flat heat pipe can be modeled by assuming a uniform heat flux on the bottom side of the plate and two uniform or non-uniform heat sources/sink combinations located on the centerline. In this design, the working fluid evaporates from the heated capillary wicking structure and condenses on the opposite cold surface. The condensed working fluid then flows towards the heated area, driven by the capillary force created by the curvature of the liquid-vapor interface in the wick pores. The higher the power density, the larger the velocity in the porous layer, as a result, the greater the liquid pressure drop through the capillary wick structure. Beyond the point where the total pressure drop from the liquid and vapor phases equals the capillary pumping capacity of the wick structure, the capillary pumping is not sufficient to return the working fluid to the heated area and the capillary limit is reached.

$$\Delta P_{total} = P_{cap}$$

The total pressure drop through the heat spreader can be expressed as $$\Delta P_{total} = \Delta P_l + \Delta P_v + \Delta P_g + \Delta P_{ph,e} + \Delta P_{ph,c}$$

where
$\Delta P_l$ = the pressure drop through liquid phase;
$\Delta P_v$ = the pressure drop through vapor phase;
$\Delta P_g$ = the pressure drop by gravity;
$\Delta P_{ph,e}$ = the pressure drop in the evaporation;
$\Delta P_{ph,c}$ = the pressure drop in the condensation;
and the pressure required to drive the working fluid, is created by the capillary structure, which is related to the meniscus radii of the liquid-vapor interface. The maximum pressure difference can be expressed by the Laplace-Young equation as $$\Delta P_{cap} = \frac{2\sigma \cos\alpha}{r_{m,e}}$$

The structural and physical properties of the capillary wick have a significant effect on both the evaporation process and the capillary action. The heat transfer and fluid flow mechanisms in the wick structure can be described by the mass, momentum and energy conservation equations. The liquid flow in the direction perpendicular to the heated surface is much smaller than that flowing in a parallel direction hence, the capillary flow can be treated as a two-dimensional problem. In addition the flow is laminar.

A thermofluid design approach, in the context of watercraft and landing pad embodiments, exploits three features: (i) the lift-fan or propeller air currents are used to reduce the amount of heat deposited into the landing pad, (ii) the significant phase-change based heat capacity of the landing pad is used to store the heat that is deposited with a small rise in temperature, and finally (iii) the ever-present wind over-deck is used to quickly remove the deposited heat. The approach in support of the design activity is based on modeling and simulation, coupled with sub-scale experimentation. It should be appreciated that the application of these features is not limited to this context.

The heat pipe TMS is effectively a constant-volume phase-change device. The time-scale of the thermal transport and storage processes within this device are short compared with the fluid-dynamical and thermal time scales external to the device. Therefore, the well-developed relations of equilibrium thermodynamics can be use to determine the heat storage capability of the proposed designs. Additional heat will change the quality of the vapor-liquid mixture of the working fluid contained in the TMS. The vapor and the liquid each have a temperature-dependent internal energy. The change in quality, combined with the temperature dependence of the internal energy allows one to compute a heat capacity for the system. The resulting capacity will be a function of the fill ratio, volume of the system, and the starting and ending temperatures of the TMS. Assuming a prototypical aluminum heat plate with water as the working fluid and a nickel foam wick, the internal energy stored by a heat plate is given by:

$$Q=m_f(U_2-U_1)_f+(m_{Al}C_{Al}+m_{Ni}C_{Ni})\Delta T$$

where $m_f$ is the mass of the working fluid (water), $U_1$ and $U_2$ are the internal energies of the working fluid at ambient and the operating temperature, $m_{Al}$ and $m_{Ni}$ are the masses of the aluminum case and nickel foam, $C_{Al}$ and $C_{Ni}$ are their heat capacities, and $\Delta T$ is the rise in temperature. If the temperature rise is taken to be 200° F., Q is around 100-200 MJ for the dimensions shown in the figures. We note that the energy delivered into the deck by an F-35B vertical landing or MV-22 launch sequence is about 25-75 MJ suggesting temperature increases could be significantly less than 100° F. for well designed systems.

Figure 11:
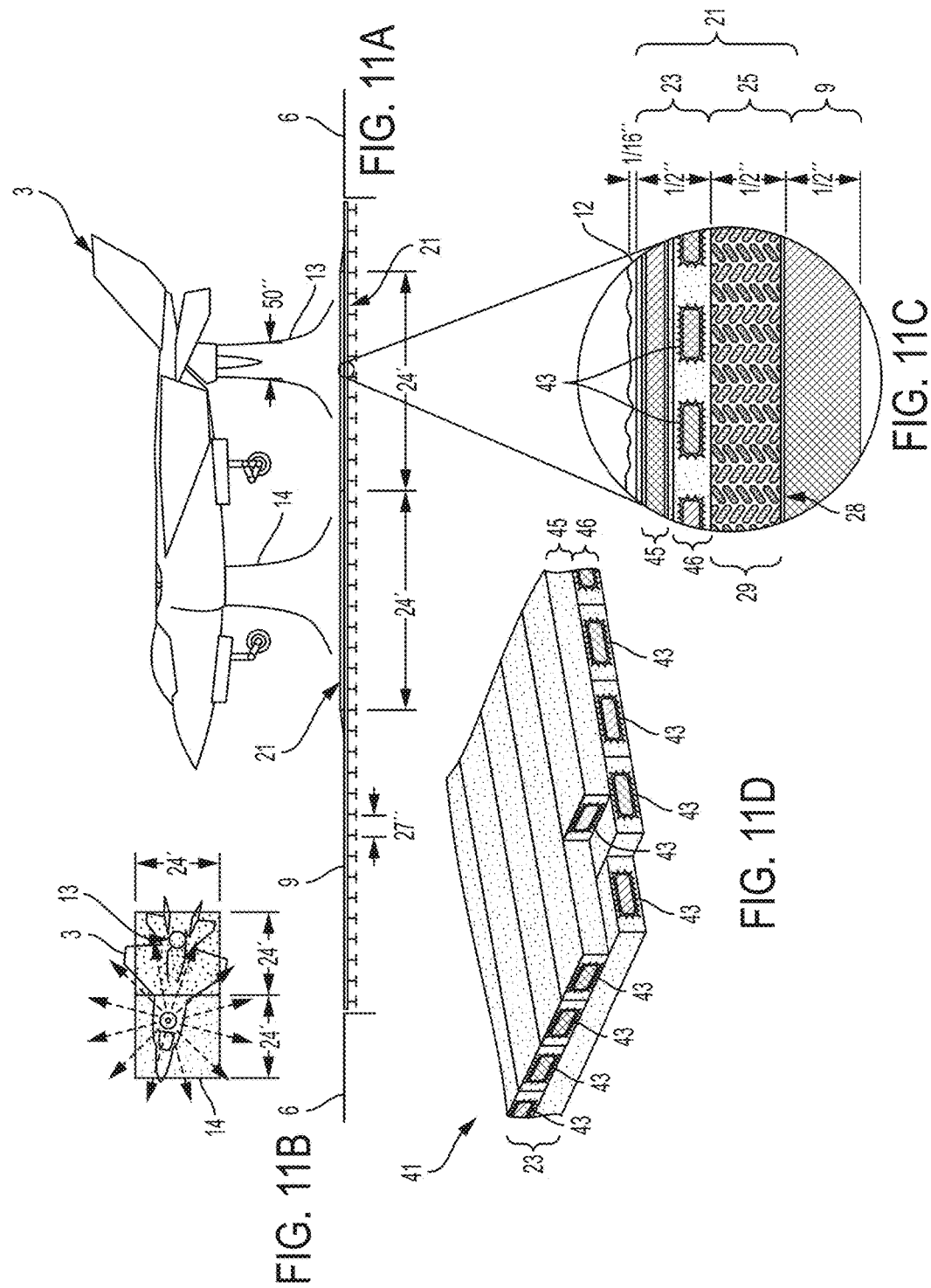
FIG. 11A is a schematic illustration showing the side view of an aircraft, such as a JSF aircraft, and a TMS.
FIG. 11B is a schematic illustration showing a top view of the JSF.
FIG. 11C is a schematic illustration showing an enlarged partial cross-sectional view of a TMS of FIG. 11A incorporating a non-skid layer and a two-layer heat pipe system.
FIG. 11D is a schematic illustration of an enlarged portion of two-layer heat pipe system of FIG. 11C.

FIG. 11 shows a representative illustration of an LHD-class amphibious ship flight deck landing pad, modified above decks to ensure load constraints are satisfied while also incorporating a thermal management system (TMS) based upon cellular metal structures and heat plate technology. The deck surface 9 as shown is constructed from 9/16" thick HY-100 steel (ambient temperature elastic modulus of HY-100 is 29.0 ksi (200 GPa)) and is supported by longitudinal stiffeners and transverse beams (as shown, for example, in FIG. 9). FIG. 11A shows the side view of an aircraft 3 (e.g., F-35B Joint Strike Fighter (JSF) airplane or other air craft) projecting a cold plume 14 and hot plume 13 downward upon the TMS 21, which is covering the steel deck plating 9 of a flight deck 6. FIG. 11B shows a top view of this aircraft 3. The TMS and steel deck plating of FIG. 11A are shown in an enlarged cross-sectional view in FIG. 11C, which shows a non-skid layer 12, a high thermal conductivity layer 23, the low thermal conductivity layer 25, and the steel deck plating 9. It should be appreciated that the utilization of a non-skid layer is not a limitation upon any embodiment of the invention. FIG. 11C also depicts a low thermal conductivity layer 25 that incorporates a weave structure 29. The weave structure shown is a 3d weave of glass fibers in a low thermal conductivity matrix. However, it should be appreciated that the low thermal conductivity layer 25 is in no way limited to such structures, and furthermore that these weave structures could have any number of other arrangements or compositions, such as unidirectional, multidirectional, or 3d weaves of glass or polymer fibers or other suitable materials. It should also be appreciated that the specific constructions, materials, arrangements, orientations, and dimensions depicted in these figures are merely examples. A primer 28 layer on the deck is also depicted, though such a layer is optional.

FIG. 11D provides a perspective view of the high thermal conductivity layer 23 that is an enlarged partial view of the high thermal conductivity layer of FIG. 11C. This illustration depicts a heat pipe system 41 having two heat pipe layers 45, 46, each of which contain multiple heat pipes 43 parallel to other heat pipes 43 within the same layer. These heat pipe layers are oriented in a 0/90° arrangement with respect to each other to improve in-plane heat spreading across the high thermal conductivity layer 23. It should be appreciated that the specific dimensions of the aircraft, layers, and heat pipes; the arrangement and orientation of these components; and the material composition of these components serve merely as illustrative examples and do not serve as limitations upon any embodiment of the invention.

Figure 12:
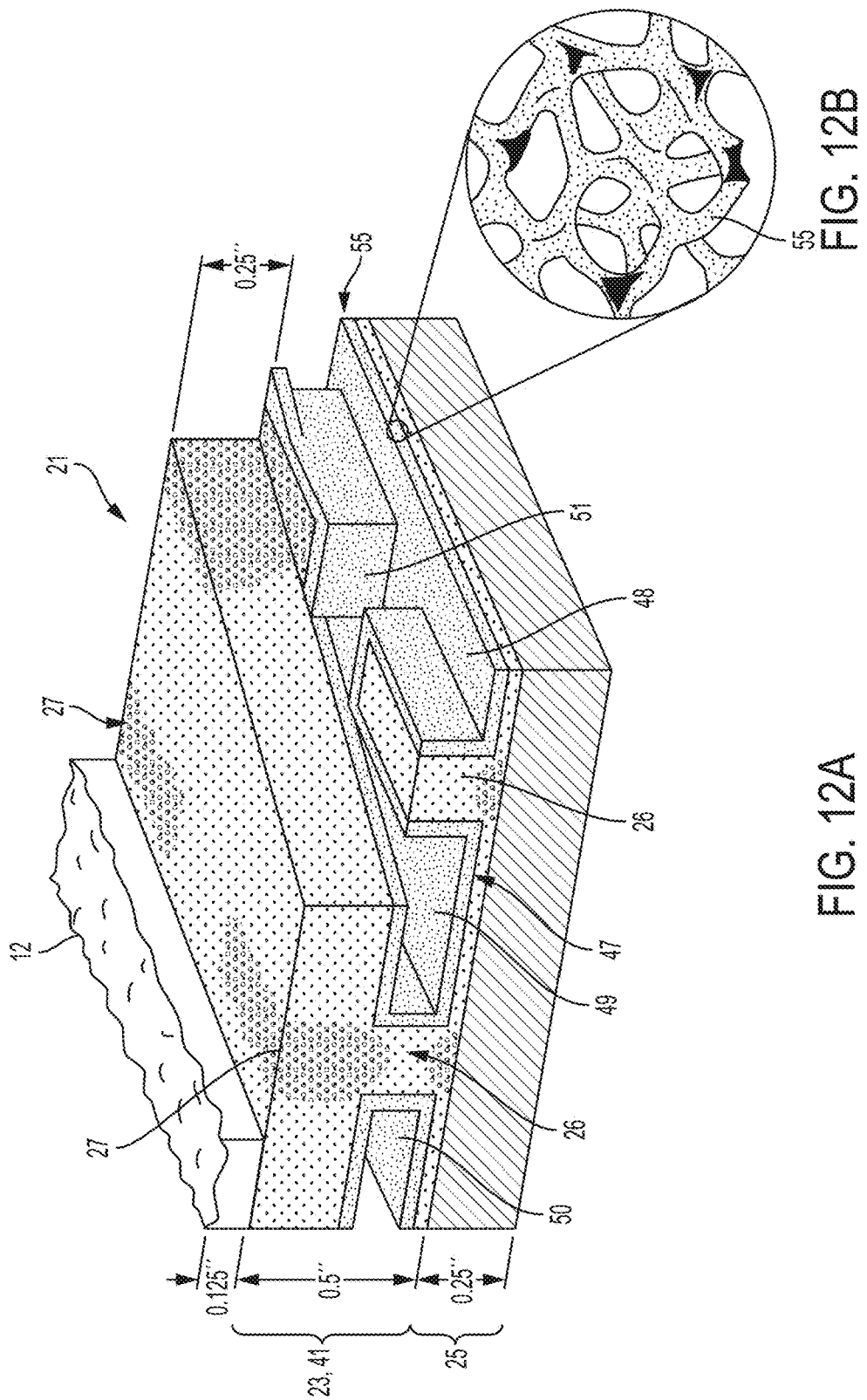
FIG. 12A is schematic illustration of a TMS incorporating a single layer of perpendicular, interconnected heat pipe channels.
FIG. 12B is a schematic illustration showing an enlarged partial view of a heat pipe wicking structure of FIG. 12A.

Potentially thinner thermal panel designs with the requisite structural capability as well as advanced thermal management based upon heat pipe technology are shown in FIG. 12. The system in this approach again carries significant loads, so the core must support significant compressive and impact loads. A nickel foam wicking material can be used inside the sandwich panel resulting in a light sandwich panel system with very good intrinsic resistance to corrosion and non-condensable ($H_2$) gas formation over prolonged periods of intended use (many years). Such a system would use standard manufacturing methods for welding the core to the face sheets, and the graded pore size Inco nickel foam wicking materials would be inserted into the open spaces between the corrugated core and the face sheets, in order to provide flow of the cooling fluid (distilled water or water containing melting point depressants and corrosion inhibitors) by capillary action. The TMS 21 depicted in FIG. 12 may include a non-skid layer 12, a high thermal conductivity layer 23, and a low thermal conductivity layer 25. In this depiction the high thermal conductivity layer comprises a heat pipe system 41 that contains a single layer of interconnected heat pipe channels 48, 49, 50, and 51, which have contiguous inner spaces. It should be appreciated that additional high thermal conductivity layers could be added, and that the exact composition and arrangement of the heat pipe channels shown serves merely to illustrate one aspect of an embodiment of the invention and do not serve as a limitation. Other embodiments (although not shown) may also utilize similarly arranged heat pipes or heat pipe channels that intersect without having contiguous inner spaces, and others may utilize a combination of both approaches. It should also be appreciated that the non-skid layer may or may not be included in this and other embodiments of the invention. FIG. 12B shows an enlarged view of the wicking structure 55. It should be appreciated that the porous nickel foam wicking structure shown in FIG. 12B is merely an example of one wicking structure and material that might be used.

It should be appreciated that the pipe channels may be constructed with different arrangements and contours. For example, their arrangement and contours may create multicellular polygonal arrangements, such as triangular or hexagonal arrangements, or other contours whether straight or curved. It should be appreciated that all such arrangements may be implemented with many different heat pipe or heat pipe channel constructions.

Referring to FIG. 12A, the high thermal conductivity layer 23 may be fabricated out of the same high strength low alloy steel may be used to construct deck plates. Web core structures 26 that help define the interconnected heat pipe channels 48, 49, 50, and 51 are disposed and can be welded to combine an upper region (e.g., plate or layer) and lower region (plate or layer) of the high thermal conductivity layer 23 together at the weld regions 27.

It should be appreciated that the web core structures 26 may be a variety of shapes, sizes, contours, dimensions or materials as required.

The high conductivity thermal layer 23 may be a variety of shapes, sizes, contours, dimensions or materials (e.g., HY100 steel, HY 80 or Al 6061 T6 stainless steel) as required.

Figure 13:
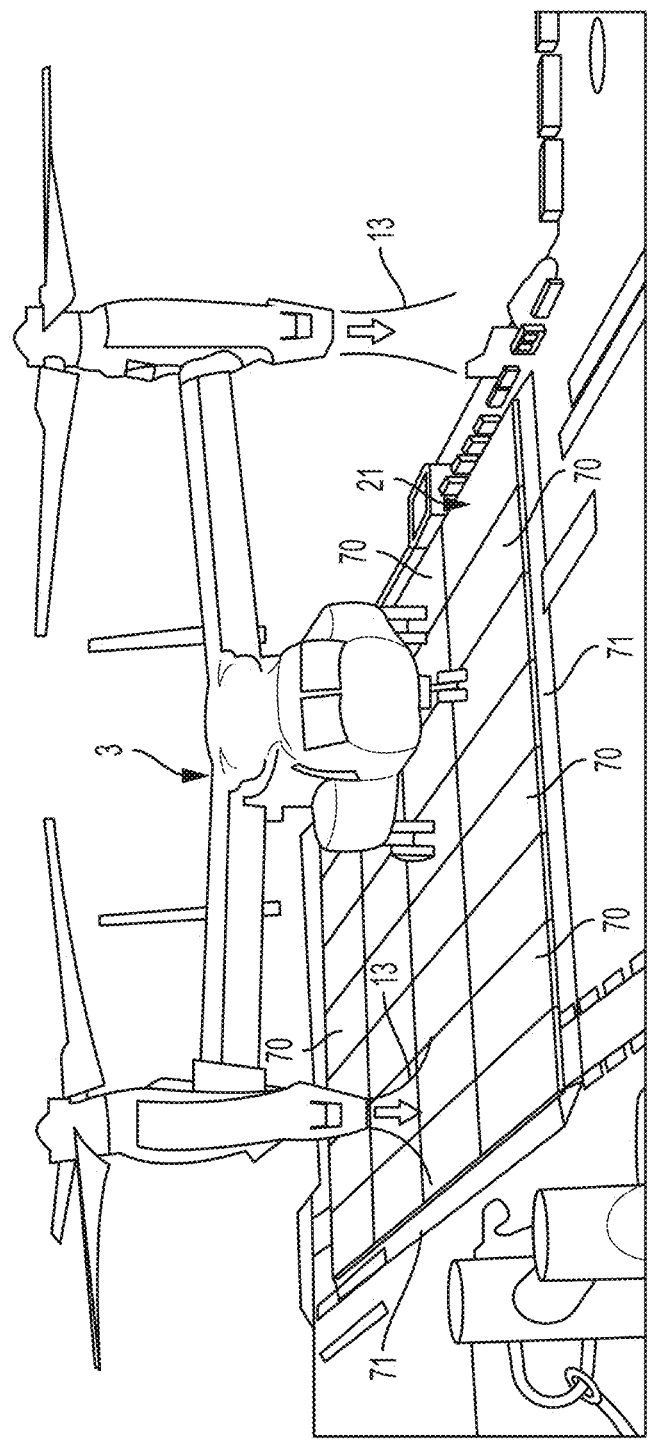
FIG. 13 is a composite photographic depiction and schematic illustration showing an Osprey aircraft and a modularly constructed TMS.
Figure 14:
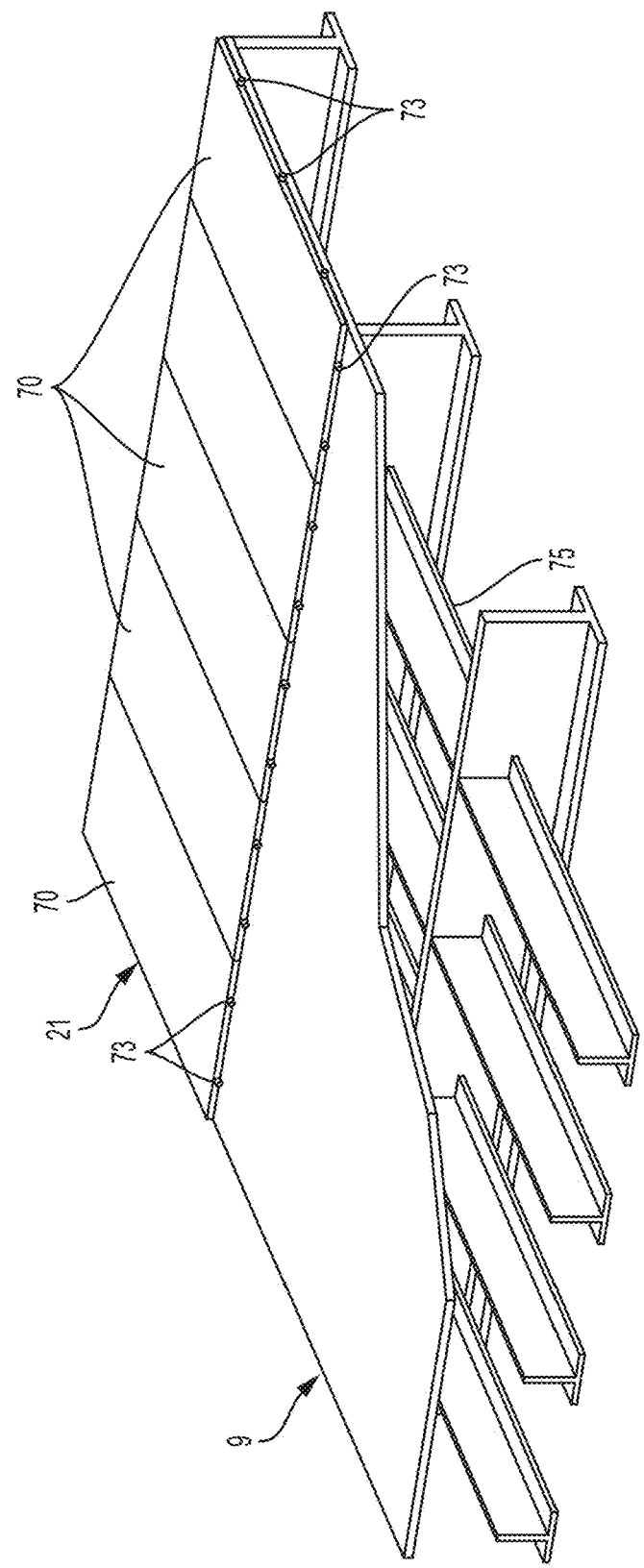
FIG. 14 is a schematic illustration of a modular TMS and an underlying deck structure.

The TMS could be made from a single panel, ensuring the most efficient thermal transport to cover the entire panel area or from sub panels, or from modules with low thermal resistance interconnects. FIGS. 13 and 14 show an example of one implementation (of many) for doing this. FIG. 13 depicts a TMS 21 that is composed of multiple modules 70.

In this approach, the modules 70 are connected to form a large area heat plate that disperses over a large area the thermal flux resulting from localized hot plume 13 impingement from an aircraft 3 (for example, MV-22 Osprey or other aircraft). In an embodiment of the invention, the heat is stored as the latent heat of working fluid evaporation and may then eventually be removed by transfer to air that flows over the deck surface due to the rotors downwash and wind over deck. It should be appreciated that such heat dissipation serves merely as an example and is not a limitation upon the invention.

It should be appreciated that the TMS is not limited to this modular construction (for example, the TMS could simply be constructed as a single module), and the approach depicted in FIG. 13 is merely one example of how such modules might utilized. Modular TMS systems could be constructed in any number of ways, utilizing modules of different shapes, contours, interconnections, interconnection means, and arrangements in order to create a TMS in any number of shapes, contours, dimensions, and sizes. Furthermore, it should appreciated that the TMS may utilize any number of heat dissipation methods or structures, including wind, thermal interconnection with any type of heat sink, thermal interconnection with a body of water, circulation of cooling substances on or within said system, or many other heat dissipation means. Optionally, a ramp skirt 71 may surround or at least partially surround the perimeter of the modules 70. It should also be appreciated that the physical interconnection of these modules could occur at any time between module construction and on-site application.

Since the internal structure may be partially evacuated (to about 0.1 atmospheres), in one embodiment of the invention, these connections would provide both an appropriate mechanical and vacuum interlocking so that both stresses and vapor/liquid flow occurs between the panels. In such an embodiment, the method of attachment to the deck would not weaken the deck structure and may also enable the easy removal and reinstallation of the deck protection system when panel repair, panel upgrades or deck maintenance are necessary. It should be appreciated that such an approach could be accomplished by many different thermal interconnection methods and structures, and the specific depictions of FIGS. 13 and 14 merely serve as examples.

FIG. 14 shows in more detail how such a modular approach might be implemented. In this particular example, the TMS 21 comprises multiple TMS modules 70 overlaying the deck plating 9, and each module 70 contains several thermal interconnections 73. Again, it should be appreciated that these depictions merely show one example of how such an embodiment might be constructed. Any number of interconnections and any number of shapes, contours, dimensions, sizes, compositions, and arrangements of such modules and interconnections may be utilized in other modular approaches. A deck stiffener substructure 75 may be provided, but such structures are optional.

The TMS may be subjected to the same mechanical loadings experienced by the underlying load-bearing surface and must be able to support these loads without suffering failure. If the panels are fully back supported, a significant issue will be local indentation resulting from the finite compressibility of the core structure. One potential solution to this is illustrated in FIG. 12, whereby the high thermal conductivity layer 23 may be fabricated out of the same high strength low alloy steel that may be used to construct deck plates. The strength of the core under localized indentation loading depends upon the core topology, the relative density of the core and the material used to construct the core. Various designs may address other failure modes including front face perforation and compressive wrinkling which are likely to increase the minimum face sheet thickness. The use of an HY100 steel to make the sandwich panels raises a potential problem with noncondensable gas generation when distilled water is used as the working fluid. This problem can be very effectively solved by providing a plating layer 47 as shown in FIG. 12, such as an electroless plating layer with nickel on all interior surfaces of the structure. A lower relative density version of the core could be used for enhanced 2D vapor flow, but the specifics of the design would be dictated by mechanics considerations.

A second approach that is less sensitive to leaks is shown in FIG. 15. FIG. 15A schematically shows the side view of an aircraft 3 projecting a hot plume 13 and cold downwash 15 downward upon the TMS 21, which is covering the steel deck plating 9 of a flight deck 6. The TMS may optionally have a ramp skirt 71. FIG. 15B schematically shows a top view of this aircraft 3. FIG. 15C shows an enlarged partial perspective view of the TMS 21 and the deck plating 9. The TMS 21 and steel deck plating 9 of FIG. 15C are depicted in an enlarged partial cross-sectional view in FIG. 15D, which shows a high thermal conductivity layer 23 (composed of heat pipes 43 interposed in non-skid material 16), a low thermal conductivity layer 25, and the steel deck plating 9. FIG. 15E is an enlarged schematic perspective illustration of a heat pipe 43 segment of a heat pipe system 41 of FIG. 15D. The heat pipe system 41 shown here utilizes space efficient cusp-shaped longitudinal wicks. These provide a high capillary pumping pressure and maximize the cross sectional area for vapor flow. In this approach, the individual pipes are held in position by infiltrating the spaces between them with the thermally sprayed non-skid material 16. However, numerous other means of applying the non-skid material or otherwise constructing this system may be utilized. Furthermore, it should be appreciated that the specific constructions, materials, arrangements, orientations, sizes, contours, and dimensions depicted in these figures are merely examples and do not serve as limitations upon any embodiment of the invention.

Figures 16A, 16B, 16C:
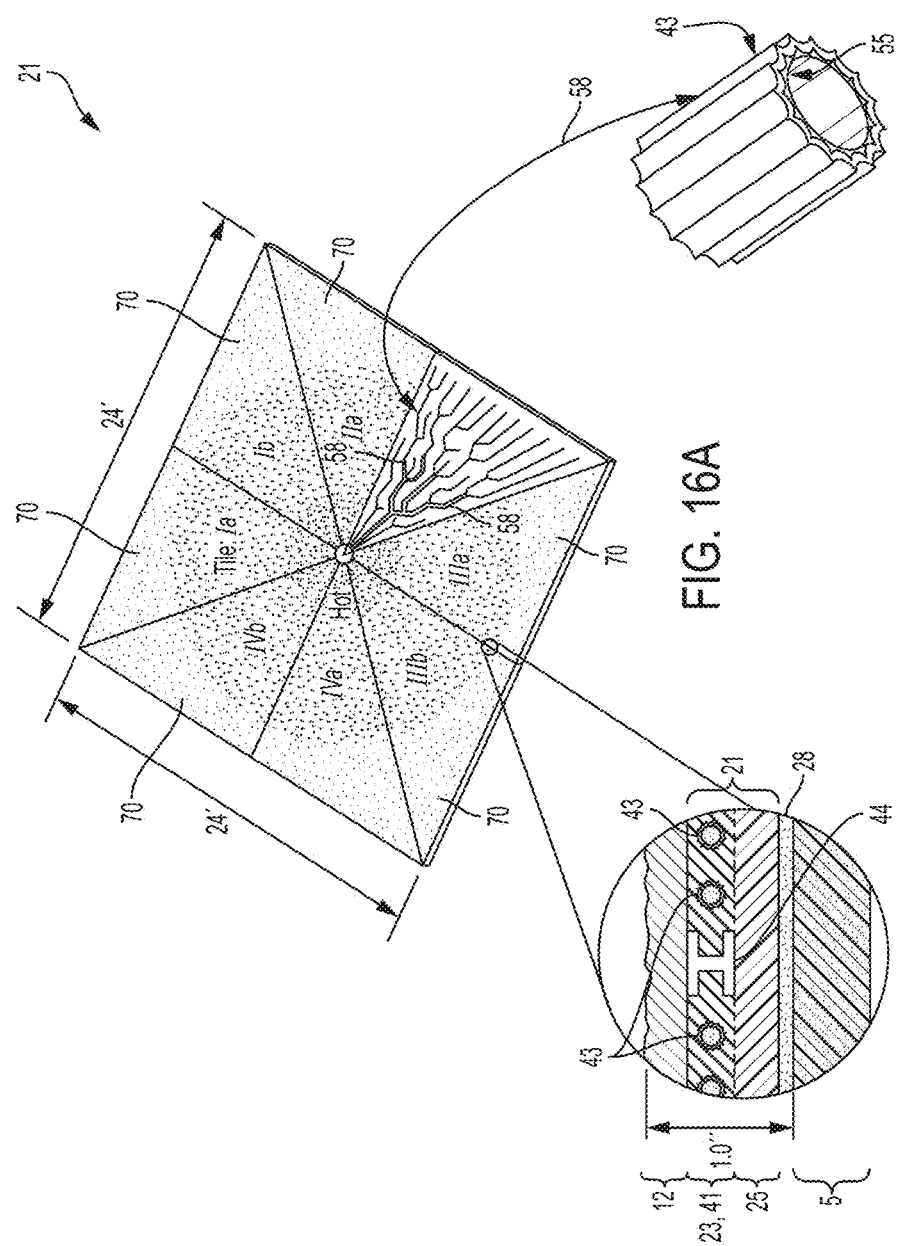
FIG. 16B is a schematic perspective illustration of a heat pipe segment found in FIG. 16A.
FIG. 16C is a schematic illustration showing an enlarged partial cross-section of the TMS found in FIG. 16A.

FIG. 16A schematically depicts another aspect of an embodiment of the invention in which a single layer of heat pipes 43 has a radial arrangement 58, achieved in this example using an arterial arrangement. This particular approach minimizes the length of the most costly element of the system (the heat pipes 43) and may enable a halving of the heat plate layer thickness. FIG. 16A also schematically shows the TMS 21 constructed from multiple TMS modules 70. FIG. 16B shows an enlarged partial schematic perspective illustration of a heat pipe segment 43 having heat pipe wicking structure 55 from FIG. 16A. FIG. 16C schematically shows an enlarged partial cross-section of the TMS 21 found in FIG. 16A containing the high thermal conductivity layer 23 (here implemented as a heat pipe system 41), and the low thermal conductivity layer 25, along with a non-skid layer 12 and the underlying load-bearing surface 5 and primer 28. Couplings or connectors 44 may be provided to couple or connect modules of the high conductivity layer 23 together, or any other suitable bonding or connecting may be implemented. It should be appreciated that the specific constructions, materials, arrangements, orientations, contours, sizes, and dimensions depicted in these figures are merely examples and do not serve as limitations upon any embodiment of the invention.

Figure 17:
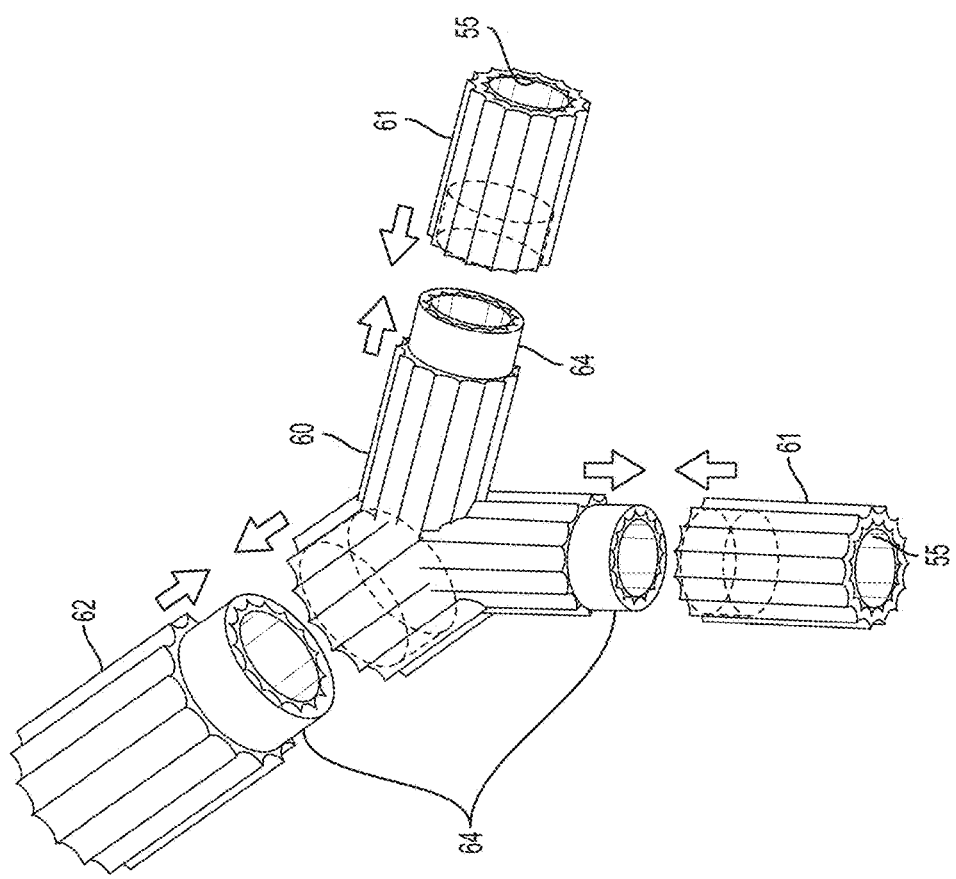
FIG. 17 is a schematic perspective illustration showing separate heat pipe segments capable of being coupled together.

The approach shown in FIG. 16 may be implemented using a heat pipe coupling mechanism shown in FIG. 17 with heat pipe coupling segments 60, 61, and 62 having heat pipe wicking structure 55. It should be appreciated that such coupling may be achieved in many different ways, and the depicted example does not serve as a limitation. For instance, the heat pipe segments 60, 61, and 62 may be attached using various adhesives 64 or bonding. Furthermore, heat pipe coupling may also be used to construct heat pipe systems with different arrangements and contours. For example, similar coupling segments could be used to create multi-cellular polygonal arrangements, such as triangular or hexagonal arrangements, or other contours whether straight or curved. It should be appreciated that all such arrangements may be constructed using many different heat pipe or heat pipe channel constructions and are not limited to coupling embodiments.

It is important to note that the non-skid layer shown in several figures may or may not be utilized in any embodiment of the invention. When present, the non-skid layer may be composed of polymer epoxy, metal alloy-based materials, or any other material suitable for this purpose. Many non-skid coating materials can be used for a high friction coefficient and corrosion protecting coating. Candidates include Super Hard Steel® (SHS) alloys produced by The NanoSteel Company. The alloys are available in the form of atomized powders, 0.6-2 mils in diameter, and produce coatings that have yield strengths in excess of 400 ksi. Furthermore, because of their amorphous or nanoscale microstructure, SHS alloys exhibit superior wear and corrosion resistance relative to conventional steels. These amorphous or nanocrystalline materials can be made in powder form and deposited by atmospheric spray deposition processes amenable to ship board application. Other coating materials include amorphous/nanocrystalline aluminum alloys (which have demonstrated superior wear and corrosion resistance relative to conventional aluminum alloys) as well as aluminum-SiCp composites. These materials have the advantage of having lower density and higher conductivity relative to steels, but are intrinsically weaker than the SHS alloys. Furthermore, such non-skid material may be applied in many different ways, including but not limited to thermal-spraying means and adhesive bonding. This flexibility as to material and means of application also applies to embodiments of the invention where the non-skid material does not constitute a distinct layer, but is actually interspersed in the high thermal conductivity layer.

EXAMPLES

Practice of an aspect of an embodiment (or embodiments) of the invention will be more fully understood from the following examples and experimental results, which are presented herein for illustration only and should not be construed as limiting the invention in any way.

When the MV-22 Osprey is in its helicopter mode, there are two downward components of air flow impinging on the flight deck: hot exhaust gases from the jet engine and ambient temperature air from the aircraft's rotors. Both of these flows impinge upon the flight deck vertically and the streamlines are then directed radially outwards. Because the air flow induced by the aircraft's propellers is much lower than the hot exhaust air flow, it provides a potential source of cooling for the flight deck. The same is true for the F-35B's lift-fan air.

Figure 5A:
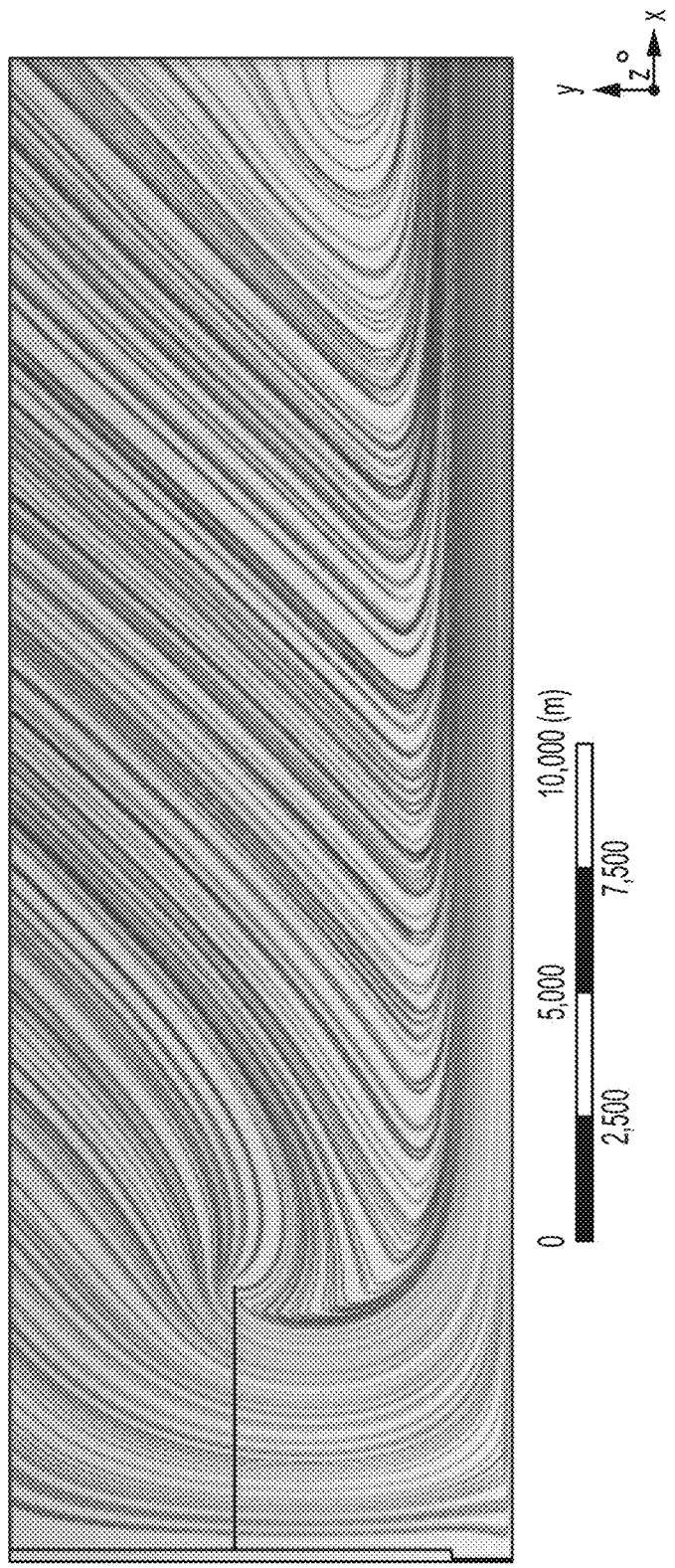
FIGS. 5A and 5B illustrate flow streamlines for the Osprey without and with rotor downwash, respectively.
Figure 5B:
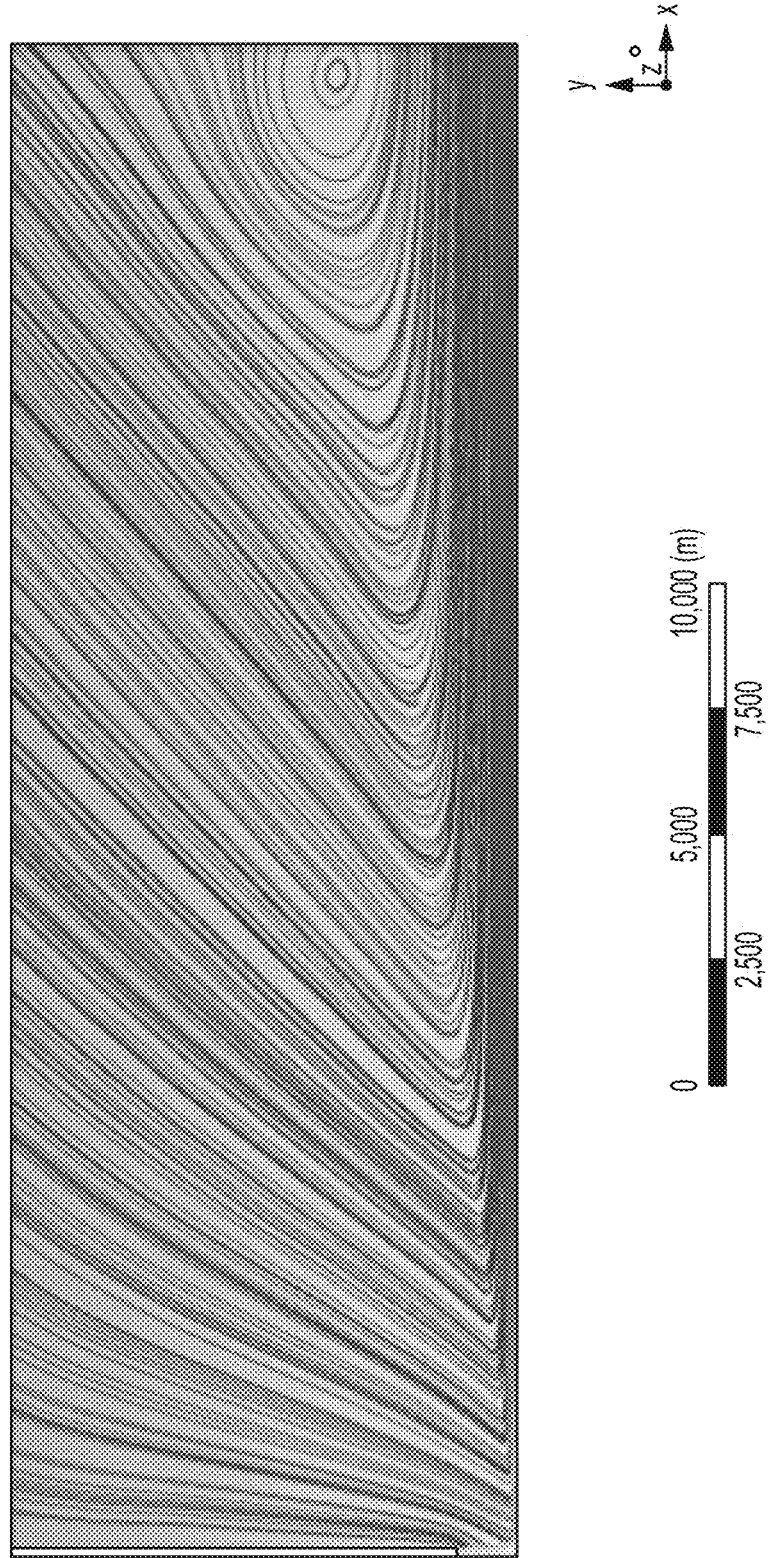
Figure 6A:
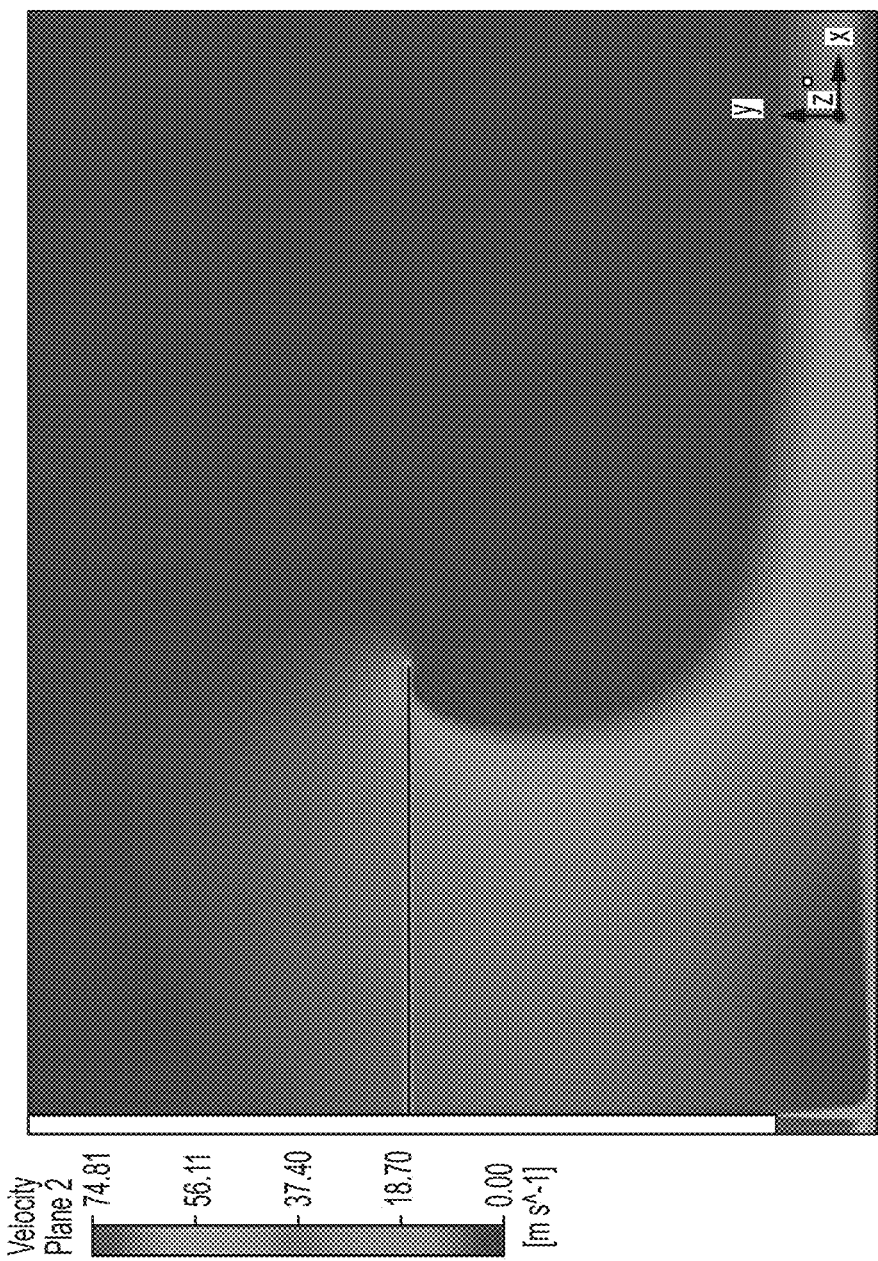
FIG. 6A shows velocity contours for the Osprey when downwash is present.
Figure 6B:
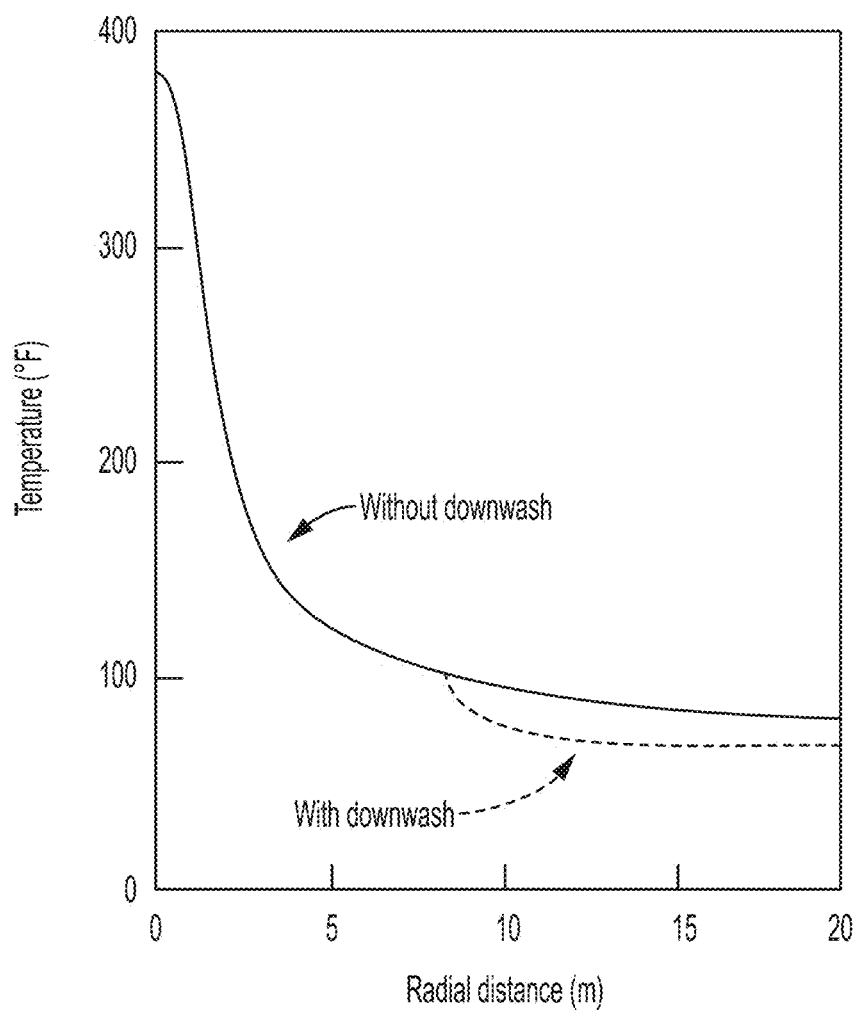
FIG. 6B is a graphical plot showing the radial distribution of deck temperature with and without downwash.

In certain landing pad and flight deck embodiments, proposed solutions rely on exploiting the air outside the jet exhaust plume to reduce the heat deposited into the deck. Preliminary CFD computations have ascertained the thermal environment created on the current deck by the MV-22 engine. The idling engine is simulated with an axisymmetric exhaust plume having a temperature of 375° F. and a mass flow rate of 11 kg/s. The plume exits from a 1 ft diameter nozzle at a height of 4 ft above the ground. A rotor of radius 19 ft exists at a height of 18 ft above the deck. The mass flow for the idling rotor is arbitrarily taken to be $\frac{1}{10}$ that needed for lift-off (equivalent to 7 m/s over the rotor disk). With these assumptions, the flow field and temperature fields, as well as the adiabatic wall temperature as a function of the radial distance, have been calculated using a computational fluid dynamics (CFD) analysis for cases in which the rotor is or is not present. FIG. 4 is a schematic illustration showing a front view of the V22 Osprey aircraft and a mesh employed for computational fluid dynamics calculations for the Osprey's exhaust plume and downwash. FIG. 4 shows the meshed geometry and illustrates the location of the rotor and the engine. FIGS. 5A and 5B are schematic illustrations showing flow streamlines for the Osprey without and with rotor downwash, respectively. FIG. 5 demonstrates the effect of the rotor downwash on the streamlines of the flow field. In the absence of the downwash, the cool ambient air is entrained into the exhaust plume. With the addition of the downwash, the ambient air is forced downward, some mixing with the hot jet exhaust and some sweeping over the deck surface. The resulting velocity contours when the downwash is present and the temperature distribution on the deck are shown in FIG. 6. FIG. 6A is a schematic illustration showing velocity contours for the Osprey when downwash is present. FIG. 6B is a graphical plot showing the radial distribution of deck temperature with and without downwash. The latter results correlate favorably with the experimental measurements of Davis et al. (FIG. 7). FIG. 7 is a graphical plot showing a map of measured temperature distribution a deck surface. See Edward L. Davis, Young C. Hwang and David P. Kihl, "Structural Evaluation of an LHD-Class Amphibious Ship Flight Deck Subjected to Exhaust Gas Heat from a MV-22 Osprey Aircraft" NSW-CCD-65-TR-2006/12 Mar. 2006.

The preceding illustrative computational results are based on only preliminary estimates of the boundary conditions (mass and thermal fluxes, air temperatures, etc.) and thus the results should be interpreted with some caution. Under the present set of assumed conditions, the principal mechanism of cooling is through radial heat flow along the deck; the downwash appears to provide only marginal additional benefit (FIG. 6B). However, the latter effect is expected to become much more significant when the downwash velocity at the rotor exceeds the assumed value of 7 m/s (during preparations for lift-off).

The forward motion of the ship, along with sea breeze, gives rise to a 20-30 kt wind speed over the flight deck. Idealizing the landing pads and the ship deck as flat plates, one can use well-known correlations for the convection heat transfer from the heated surface of the landing pad after the craft has departed or rolled away. The boundary layer over a smooth flat plate transitions from laminar to turbulent in about 1-1.5 meters. Given the location of the pads on the deck, as well as the roughness of the surface, the boundary layer over the pads will be fully turbulent. Furthermore, the convective heat transfer is augmented by radiation heat transfer as well. To explore the effectiveness of this wind-over-deck as a means of removal of heat from the heated pad, several scenarios have been considered for both the 20 kt and 30 kt wind speeds. For a headwind, the typical distance to the edge of the pad is taken as 50 m; for a side wind, it is 2 m. The air temperature is taken to be that of the water temperature, which can be as high as 80 F in warm climates. The sky temperature (for radiative cooling) is taken as 230K at night and 285K during the day. With these assumptions, the following table estimates the times required to remove 1 MJ from the pad:

| 20 knots | | | | 30 knots | | | |
|---|---|---|---|---|---|---|---|
| NIGHT | | DAY | | NIGHT | | DAY | |
| HEAD-W | SIDE-W | HEAD-W | SIDE-W | HEAD-W | SIDE-W | HEAD-W | SIDE-W |
| 2.51 s | 2.07 s | 2.83 s | 2.29 s | 2.15 s | 1.72 s | 2.39 s | 1.87 s |

The total heat that is deposited into the deck by the F-35B over 1 minute is about 25 MJ. Therefore, depending on the particular conditions, it takes between 40 and 80 seconds to remove this heat the wind over deck. Additional heat is removed by conduction to the surrounding metallic deck structure, and by the lift-fan air, making this a conservative estimate of the time required to restore the TMS to ambient.

Figure 8:
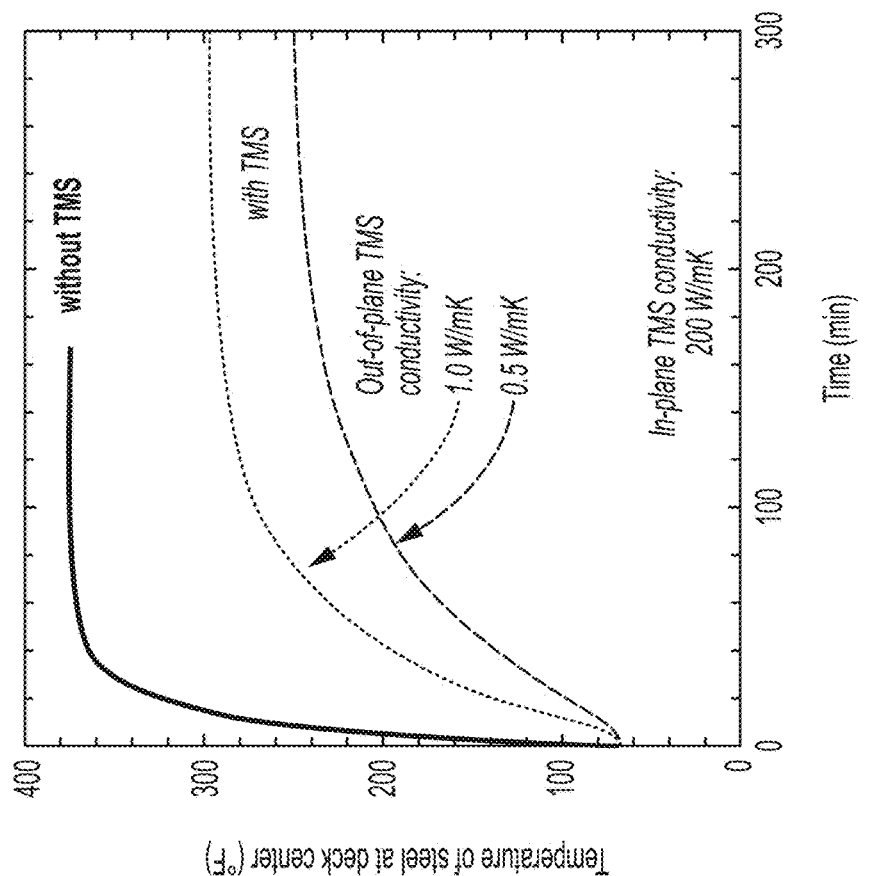
FIG. 8 is a graphical plot showing time distributions of peak steel temperature (at the stagnation point) for the three different scenarios.

The effectiveness of the design also depends on the extent of the system's anisotropic heat conductivity, i.e. high in-plane and low through-thickness thermal conductivities. To demonstrate the effects of a thermal anisotropy, analytical solutions have been employed to compute temperature distributions for two idealized cases: (i) a TMS with an outer ⅜" thick high-conductivity layer (of the order of copper's) and a ⅜" air gap (with a conductivity of 0.5 W/mK) between the layer and the steel deck; and (ii) a TMS with a ⅜" high-conductivity layer and a ⅜" thick interlayer (with a conductivity of 1 W/mK which is similar to the conventional non skid material. To establish a baseline, corresponding calculations were performed for the bare (unprotected) steel deck. In all cases, the distribution of the air temperature was taken to be that obtained from the preceding CFD calculations plotted in FIG. 6B using a representative convective heat transfer coefficient of 50 W/m2K. The key results are plotted on FIG. 8. FIG. 8 is a graphical plot showing time distributions of peak steel temperature (at the stagnation point) for the three different scenarios. Absent a TMS, the deck temperature rises rapidly, exceeding 300° F. after about a quarter of an hour. With the high-conductivity/air TMS, the rate of deck heating is appreciably lower: the temperature reaching only 170° F. after 3 hours and steady state is not obtained until much longer times. A high-conductivity polymer TMS exhibits intermediate performance. Most notably, although the steady state temperature exceeds 300° F., the time required to reach this point is much greater than the expected heating times for typical launch missions. Furthermore, for relevant times (say 1 hour), the peak deck temperature is predicted to only reach 250° C. We note that as the heat plate system is made to operate at lower temperatures, and as its in-plane thermal conductivity is increased, the required thickness, or need for, the insulating layer decreases.

Figure 9A:
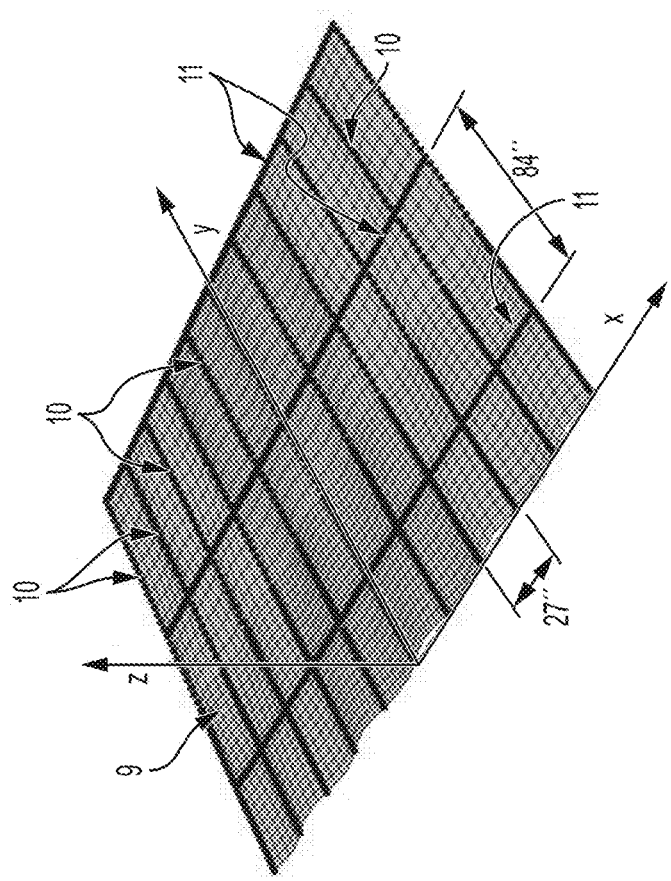
FIG. 9A is a schematic illustration of a finite element mesh of ship deck and underlying frame and stiffeners.
Figure 9B:
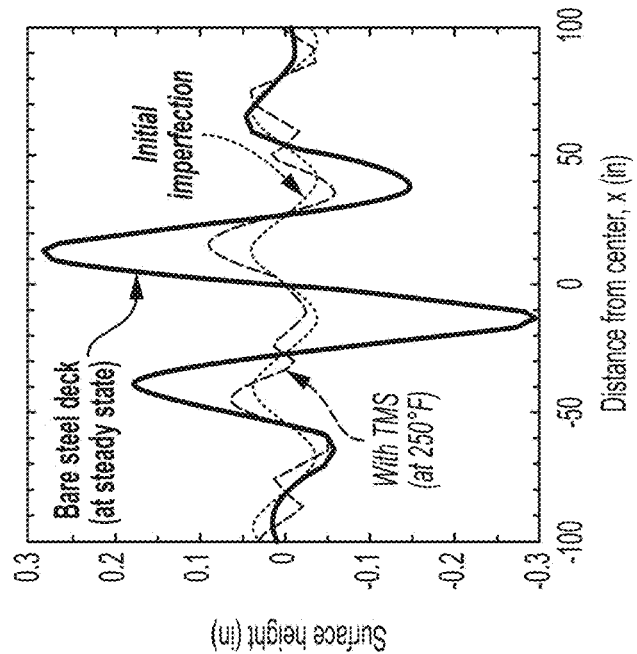
FIG. 9B is a graphical plot showing computed surface deflections at 370° F. on bare deck and on a deck utilizing a TMS.

FIG. 9A is a schematic illustration of a finite element mesh of ship deck and underlying frame and stiffeners. FIG. 9B is a graphical plot showing computed surface deflections at 370° F. on bare deck and on a deck utilizing a TMS. The effects of the heating on the deck stresses and propensity for buckling have been evaluated by finite element analysis (FEA), employing the mesh depicted in FIG. 9A. Because of symmetry, only half of the deck is required. The model was constructed using composite shell elements: one layer representing the steel deck 9 (9/16" thick) and the other representing the TMS (1" thick). For conservatism, the TMS was considered to have zero stiffness and hence provide no contribution to the load bearing capacity of the deck. The beams, girders, frame, longitudinal stiffeners 10, and transverse stiffeners 11 supporting the deck were regarded to be rigid and thus the displacements along the corresponding nodes (indicated in by the grid pattern in FIG. 9A) were taken to be zero. Calculations were performed both with and without the TMS present. Eigen-value analysis was used to ascertain the first buckling mode, and that mode was then implemented as an imperfection in all subsequent calculations. A representative initial imperfection amplitude of 0.0625" was used.

In the absence of a TMS, the effective (Mises) stress in the central region at steady state (at 370° F.) exceeds the yield strength of the deck material (100 ksi) by a small margin. Thus some degree of plastic straining is expected, with significant implications for susceptibility to low cycle fatigue. Furthermore, the out-of-plane deck deflections at steady state are severely amplified relative to the initial imperfection, with peak values rising from 0.0625" to about 0.3" (FIG. 9). The latter is comparable to (although somewhat lower than) the reported values (0.4"-0.5"). With the high-conductivity polymer TMS after 1 hour of heating (at 250° F.), the peak effective stress reaches only 50% of the material yield strength. Additionally, the peak out-of-plane deck deflection (0.1") is only slightly larger than that of the initial imperfections (FIG. 9Bb). The conclusion is that a thermally anisotropic TMS exhibits outstanding potential for mitigating the thermo-mechanical effects of the exhaust gas on deck deformation and buckling. Furthermore, the present calculations suggest that the program goals might be achieved with a TMS with an effective in-plane conductivity ≥200 W/mK and out-of plane conductivity ≤0.5 W/mK.

Figure 10:
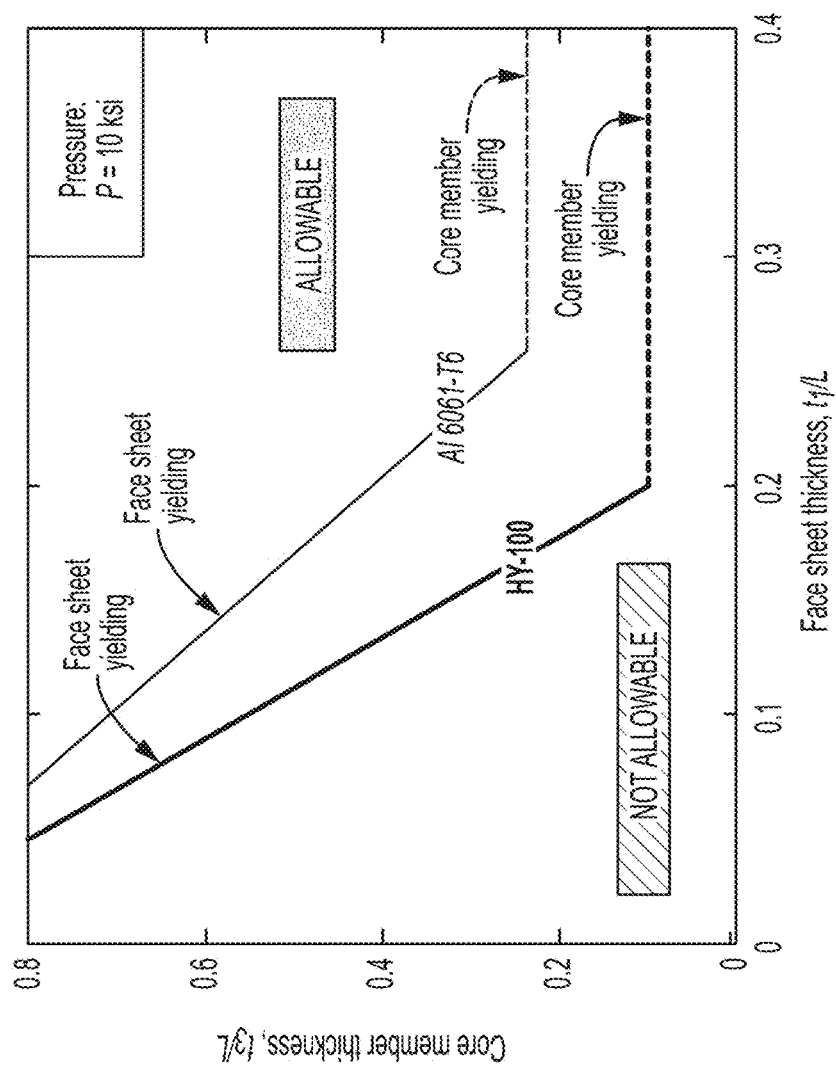
FIG. 10 is a design map for the TMS shown in FIG. 3, showing the minimum values of thicknesses to support landing loads without yielding.

Because of their presence on the topside of the flight deck, the TMS panels must also support aircraft landing loads without compromising the function of the underlying heat pipes. Preliminary estimates of the minimum dimensions needed to support the loads with only elastic deformation have been obtained from rudimentary stress analyses of the design shown in FIG. 3. The results are plotted in FIG. 10. FIG. 10 is a design map for the TMS shown in FIG. 3, showing the minimum values of thicknesses to support landing loads without yielding. The assumed pressure (10 ksi) is of the same order as that due to contact by a flat tire during standard landing operation. Two potential failure modes are addressed: yielding of the outer face sheet (due to local bending stresses) and yielding of the core members (due to direct compression). Results are shown for two candidate materials: HY-100 steel (that used in current flight decks) and Al 6061-T6 (a lower density alternative). To avoid both yield conditions in the HY-100, the minimum face sheet thickness is t1/L=0.1 whereas the minimum web member thickness is t3/L=0.1 (L being the center-to-center spacing between web members, defined in FIG. 7). With L selected to be 1 in, the required thicknesses are $t_3 \approx 0.1$ in and $t_1 \approx 0.2$ in. Thicker members are needed for the Al design ($t_3 \approx 0.22$ in and $t_1 \approx 0.25$ in), because of the lower yield strength.

The devices, systems, compositions, structures, and methods of various embodiments of the invention disclosed herein may utilize aspects disclosed in the following references, applications, publications and patents and which are hereby incorporated by reference herein in their entirety:

1. U.S. Pat. No. 6,110,604, Rickerby, D., "Metallic Article Having a Thermal Barrier Coating and a Method of Application Thereof", Aug. 29, 2000.
2. U.S. Pat. No. 5,080,977, Zaplatynsky, I., "Composite Thermal Barrier Coating", Jan. 14, 1992.
3. U.S. Patent Application Publication No. US 2008/0135212 A1, Queheillalt, et al., "Method and Apparatus For Heat Exchange Using Hollow Foams and Interconnected Networks and Method of Making the Same", Jun. 12, 2008; U.S. patent application Ser. No. 11/928,161, filed Oct. 30, 2007.
4. U.S. Pat. No. 6,575,113 B1, Fischer, et al., "Cooled Jet Blast Deflectors for Aircraft Carrier Flight Decks", Jun. 10, 2003.
5. U.S. Pat. No. 3,620,298, Somerville, et al., "Continuous Heat Pipe and Artery Connector Therefore", Nov. 16, 1971.
6. U.S. Pat. No. 4,196,504, Eastman, G., "Tunnel Wick Heat Pipes", Apr. 8, 1980.
7. U.S. Patent Application Publication No. US 2008/0185128 A1, Moon, et al., "Flat Plate-Type Heat Pipe", Aug. 7, 2008; U.S. patent application Ser. No. 11/815,364, filed Aug. 2, 2007.
8. U.S. Pat. No. 4,170,262, Marcus, et al., "Graded Pore Size Heat Pipe Wick", Oct. 9, 1979.
9. U.S. Pat. No. 3,658,125, Freggens, R., "Internal Configuration for a Radial Heat Pipe", Apr. 25, 1972.
10. U.S. Pat. No. 4,478,784, Burelbach, J., "Passive Heat Transfer Means for Nuclear Reactors", Oct. 23, 1984.
11. ONR BAA Announcement No. 09-031, "Flight Deck Thermal Management"
12. U.S. Pat. No. 6,167,948 B1, Thomas, D., "Thin, Planar Heat Spreader", Jan. 2, 2001.
13. U.S. Pat. No. 6,725,910 B2, Ishida, et al., "Heat Pipe and Method for Processing the Same", Apr. 27, 2004.
14. U.S. Pat. No. 4,020,898, Grover, G., "Heat Pipe and Method and Apparatus for Fabricating Same", May 3, 1977.
15. U.S. Pat. No. 5,195,575, Wylie, R., "Passive Three-Phase Heat Tube for the Protection of Apparatus from Exceeding Maximum or Minimum Safe Working Temperatures", Mar. 23, 1993.
16. U.S. Pat. No. 6,406,140 B1, Wotton, et al., "Anisotropic Thermal Conductivity on a Heated Platen", Jun. 18, 2002.
17. U.S. Patent Application Publication No. US 2002/0166660 A1, Norley, et al., "Anisotropic Thermal Solution", Nov. 14, 2002; U.S. patent application Ser. No. 10/167,326 filed Jun. 10, 2002.
18. U.S. Patent Application Publication No. US 21003/0094266 A1, Fritsch, B., "Cabinet Having Heat Exchanger Integrally Installed Between Roof and Solar Shield", May 22, 2003; U.S. patent application Ser. No. 10/299,492, filed Nov. 19, 2002.
19. U.S. Patent Application Publication No. US 2007/0259211 A1, Wang, N., "Heat Spread Sheet with Anisotropic Thermal Conductivity", Nov. 8, 2007; U.S. patent application Ser. No. 11/796,430, filed Apr. 28, 2007.
20. U.S. Pat. No. 3,364,991, Wang, D., "Anisotropic Thermal Insulation Construction", Jan. 23, 1968.
21. U.S. Pat. No. 5,800,905, Sheridan, et al., "Pad Including Heat Sink and Thermal Insulation Area", Sep. 1, 1998.
22. U.S. Pat. No. 6,976,532 B2, Zhan, et al., "Anisotropic Thermal Applications of Composites of Ceramics and Carbon Nanotubes", Dec. 20, 2005.
23. U.S. Pat. No. 7,507,288 B1, Sambasivan, et al., "Highly Anisotropic Ceramic Thermal Barrier Coating Materials and Related Composites", Mar. 24, 2009.
24. U.S. Patent Application Publication No. US 2002/0166658 A1, Norley, et al., "Graphite-Based Thermal Dissipation Component", Nov. 14, 2002; U.S. patent application Ser. No. 10/166,891, filed Jun. 11, 2002.
25. U.S. Patent Application Publication No. US 2009/0190290 A1, Lynch, et al., "Methods and Systems for Forming Housings from Multi-Layer Materials", Jul. 30, 2009; U.S. patent application Ser. No. 12/234,437, filed Sep. 19, 2008.
26. U.S. Pat. No. 4,756,976, Komeya, et al., "Ceramic With Anisotropic Heat Conduction", Jul. 12, 1988.
27. U.S. Pat. No. 6,319,614 B1, Beele, W., "Product to be Exposed to a Hot Gas and Having a Thermal Barrier Layer, and Process for Producing the Same", Nov. 20, 2001.
28. U.S. Pat. No. 7,292,441 B2, Smalc, et al., "Thermal Solutions for Portable Electronic Devices", Nov. 6, 2007.
29. U.S. Pat. No. 6,387,526 B1, Beele, W., "Thermal Barrier Layer and Process for Producing the Same", May 14, 2002.
30. U.S. Pat. No. 6,885,836 B2, Kimura, et al., "Image Forming Apparatus Limiting Heat Transfer", Apr. 26, 2005.
31. Danel, K. W., Lt. Col, "Excessive flight deck heating due to V-22 engine exhaust while turning on deck", Naval Air Systems Command, Technical Assurance Board Yellow Sheet Report HX21-134, 2004.
32. Bocchicchio, J., CDR, "USS Bataan flight deck deflection", United States Navy report, 2005.
33. Robinson, J. D., Clements, P. A., "Assessment of USS Bataan (LHD-5) and USS Iwo Jima (LHD-7) flight deck in way of V-22 exhaust temperature impact", Norfolk Naval Shipyard report, 2005.
34. Edward L. Davis, Young C. Hwang and David P. Kihl, "Structural Evaluation of an LHD-Class Amphibious Ship Flight Deck Subjected to Exhaust Gas Heat from a MV-22 Osprey Aircraft" NSWCCD-65-TR-2006/12 Mar. 2006.
35. U.S. Patent Application Publication Serial No. US 2005/0006365 A1, Kooken, et al., "Heat Dissipation Platform", Jan. 13, 2005.
36. U.S. Pat. No. 7,193,850 B2, Pal, D., "Integrated Heat Removal and Vibration Damping for Avionic Equipment", Mar. 20, 2007.
37. U.S. Pat. No. 3,645,478, Madelung, G., "Takeoff and Landing Platform for Vertical Takeoff and Landing Planes", Feb. 29, 1972.
38. International Patent Application Serial No. PCT/US2009/061888, filed Oct. 23, 2009, entitled "Reactive Topologically Controlled Armors for Protection and Related Method,"
39. U.S. application Ser. No. 12/479,408, filed Jun. 5, 2009, entitled "Manufacture of Lattice Truss Structures from Monolithic Materials,"
40. U.S. Utility patent application Ser. No. 12/408,250, filed Mar. 20, 2009, entitled "Cellular Lattice Structures with Multiplicity of Cell Sizes and Related Method of Use."
41. International Application No. PCT/US2009/034690 entitled "Method for Manufacture of Cellular Structure and Resulting Cellular Structure," filed Feb. 20, 2009.

42. International Application No. PCT/US2008/073377 entitled "Synergistically-Layered Armor Systems and Methods for Producing Layers Thereof," filed Aug. 15, 2008.
43. International Application No. PCT/US2008/060637 entitled "Heat-Managing Composite Structures," filed Apr. 17, 2008.
44. International Application No. PCT/US2007/022733 entitled "Manufacture of Lattice Truss Structures from Monolithic Materials," filed Oct. 26, 2007.
45. International Application No. PCT/US2007/012268 entitled "Method and Apparatus for Jet Blast Deflection," filed May 23, 2007.
46. International Application No. PCT/US04/04608, entitled "Methods for Manufacture of Multilayered Multifunctional Truss Structures and Related Structures There from," filed Feb. 17, 2004,
47. U.S. application Ser. No. 10/545,042, entitled "Methods for Manufacture of Multilayered Multifunctional Truss Structures and Related Structures There from," filed Aug. 11, 2005.
48. International Application No. PCT/US03/27606, entitled "Method for Manufacture of Truss Core Sandwich Structures and Related Structures Thereof," filed Sep. 3, 2003,
49. U.S. application Ser. No. 10/526,296, entitled "Method for Manufacture of Truss Core Sandwich Structures and Related Structures Thereof," filed Mar. 1, 2005,
50. International Patent Application Serial No. PCT/US03/27605, entitled "Blast and Ballistic Protection Systems and Methods of Making Same," filed Sep. 3, 2003,
51. International Patent Application Serial No. PCT/US03/23043, entitled "Method for Manufacture of Cellular Materials and Structures for Blast and Impact Mitigation and Resulting Structure," filed Jul. 23, 2003.
52. International Application No. PCT/US03/16844, entitled "Method for Manufacture of Periodic Cellular Structure and Resulting Periodic Cellular Structure," filed May 29, 2003,
53. U.S. application Ser. No. 10/515,572, entitled "Method for Manufacture of Periodic Cellular Structure and Resulting Periodic Cellular Structure," filed Nov. 23, 2004.
54. International Application No. PCT/US02/17942, entitled "Multifunctional Periodic Cellular Solids and the Method of Making Thereof," filed Jun. 6, 2002,
55. U.S. application Ser. No. 10/479,833, entitled "Multifunctional Periodic Cellular Solids and the Method of Making Thereof," filed Dec. 5, 2003.
56. International Application No. PCT/US01/25158 entitled "Multifunctional Battery and Method of Making the Same," filed Aug. 10, 2001,
57. U.S. Pat. No. 7,211,348 issued May 1, 2007,
58. U.S. application Ser. No. 11/788,958, entitled "Multifunctional Battery and Method of Making the Same," filed Apr. 23, 2007.
59. International Application No. PCT/US01/22266, entitled "Method and Apparatus For Heat Exchange Using Hollow Foams and Interconnected Networks and Method of Making the Same," filed Jul. 16, 2001,
60. U.S. Pat. No. 7,401,643 issued Jul. 22, 2008 entitled "Heat Exchange Foam,"
61. U.S. application Ser. No. 11/928,161, "Method and Apparatus For Heat Exchange Using Hollow Foams and Interconnected Networks and Method of Making the Same," filed Oct. 30, 2007.
62. International Application No. PCT/US01/17363, entitled "Multifunctional Periodic Cellular Solids and the Method of Making Thereof," filed May 29, 2001, and
63. U.S. application Ser. No. 10/296,728, entitled "Multifunctional Periodic Cellular Solids and the Method of Making Thereof," filed Nov. 25, 2002.

Unless clearly specified to the contrary, there is no requirement for any particular described or illustrated activity or element, any particular sequence or such activities, any particular size, speed, material, duration, contour, dimension or frequency, or any particularly interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. It should be appreciated that aspects of the present invention may have a variety of sizes, dimensions, contours, shapes, contours, compositions and materials as desired or required.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

We claim:

1. An anisotropic thermal management system for thermally protecting a load-bearing surface, structure, or component against heat being transferred from a heat source to the load-bearing surface, structure, or component, said system comprising:
    a high thermal conductivity layer comprising a high thermal conductivity material, said high thermal conductivity layer providing in-plane heat spreading across said high thermal conductivity layer, said high thermal conductivity material is an alloy of aluminum, silver, copper, diamond, graphite, or other high thermal conductivity material with a thermal conductivity greater than about 10 W/mK, said high thermal conductivity layer having a flat layer structure with uniform thickness, said high thermal conductivity layer comprising a heat pipe system having multiple heat pipes or heat pipe channels located within said thickness of said high thermal conductivity layer and surrounded and enclosed within said high thermal conductivity layer; and
    a low thermal conductivity layer comprising a low thermal conductivity material, said low thermal conductivity layer reducing heat transfer from the heat source through said high thermal conductivity layer and said low thermal conductivity layer to the load-bearing surface, structure, or component, said low thermal conductivity material comprises at least one of the following materials: aramid, polymer, polymer foams, wood, plaster, cement, concrete or any other low thermal conductivity material with a thermal conductivity less than about 1 W/mK,
    wherein the anisotropic thermal management system is configured to be installed or located between the heat source and the load-bearing surface, structure, or component to thermally and reduce heat transfer from the heat source to the load-bearing surface, structure, or component,
    wherein the low thermal conductivity layer is disposed atop the load-bearing surface, structure, or component,
    wherein the high thermal conductivity layer is disposed atop the low thermal conductive layer, and
    wherein the heat source is located atop and facing the high thermal conductivity layer.

2. The system of claim 1, wherein:
said system possesses a heat capacity such that, during periods in which heat flux causes transient build-up of heat, a rate of transient build-up of heat of said system is moderated to protect said load-bearing surface from said heat flux.

3. The system of claim 2, wherein:
said high heat capacity is at least provided in part by one or more portions or segments of phase change material.

4. The system of claim 3, wherein:
said phase change material comprises: paraffins, fatty acids, or hydrated salts.

5. The system of claim 3, wherein:
said phase changing material comprises at least one of the following:
$H_2O$; $LiClO_3.3H_2O$; $ZnCl_2.3H_2O$; $K_2HPO_4.6H_2O$; $NaOH.3\frac{1}{2}H_2O$; $Na_2CrO_4.10H_2O$; $KF.4H_2O$; $Mn(NO_3)_2$. $6H_2O$; $CaCl_2.6H_2O$; $LiNO_3.3H_2O$; $Na_2SO_4.10H_2O$; $Na_2CO_3.10H_2O$; $CaBr_2.6H_2O$; $Na_2HPO_4.12H_2O$; $Zn(NO_3)_2.6H_2O$; $KF.2H_2O$; $K(CH_3COO).1\frac{1}{2}H_2O$; $K_3PO_4.7H_2O$; $Zn(NO_3)_2.4H_2O$; $Ca(NO_3)_2.4H_2O$; $Na_2HPO_4.7H_2O$; $Na_2S_2O_3.5H_2O$; $Zn(NO_3)_2.2H_2O$; $NaOH.H_2O$; $Na(CH_3COO).3H_2O$; $Cd(NO_3)_2.4H_2O$; $Fe(NO_3)_2.6H_2O$; $NaOH$; $Na_2B_4O_7.10H_2O$; $Na3PO_4.12H_2O$; $Na_2P_2O_7.10H_2O$; $Ba(OH)_2.8H_2O$; $AlK(SO_4)_2.12H_2O$; $Kal(SO_4)_2.12H_2O$; $Al_2(SO_4)_3.18H_2O$; $Al(NO_3)_3.8H_2O$; $Mg(NO_3)_2.6H_2O$; $(NH_4)Al(SO_4).6H_2O$; $Na_2S.5\frac{1}{2}H_2O$; $CaBr_2.4H_2O$; $Al_2(SO_4)_3.16H_2O$; $MgCl_2.6H_2O$; $Mg(NO_3).2H_2O$; $NaNO_3$; $KNO_3$; $KOH$; $MgCl_2$; $NaCl$; $Na_2CO_3$; or $KF$; $K_2CO_3$.

6. The system of claim 3, wherein:
said phase change materials are disposed in said high thermal conductivity layer and/or said low thermal conductivity layer.

7. The system of claim 1, wherein:
said high thermal conductivity layer comprises at least one or more of the following: a uniform high thermal conductivity material, a non-uniform high thermal conductivity material, or a composite formed from a multiplicity of high thermal conductivity materials.

8. The system of claim 1, wherein:
said heat pipe system comprises at least one or more heat pipe layers.

9. The system of claim 8, wherein:
at least one of said one or more heat pipe layers comprises multiple heat pipes.

10. The system of claim 9, wherein:
at least portions of said multiple heat pipes within each heat pipe layer are at least substantially parallel with other said multiple heat pipes in said heat pipe layer.

11. The system of claim 10, wherein:
said multiple heat pipe layers are oriented in the same direction relative to each other.

12. The system of claim 9, wherein:
said multiple heat pipe layers are oriented in different directions relative to each other, thereby said orientation is configured to provided in-plane heat spreading in different directions along said high thermal conductivity layer.

13. The system of claim 12, wherein:
said orientation is at least substantially perpendicular.

14. The system of claim 8, wherein:
said one or more heat pipe layers are disposed in a non-skid layer.

15. The system of claim 1, wherein:
said heat pipe system comprises one or more layers of interconnected heat pipes and/or heat pipe channels, said interconnected heat pipes and/or interconnected heat pipe channels having contiguous inner spaces, wherein said interconnected heat pipes and/or interconnected heat pipe channels configured to provide in-plane heat spreading in different directions along said high thermal conductivity layer.

16. The system of claim 1, wherein:
said heat pipe system comprises one or more layers of intersecting heat pipes or intersection heat pipe channels, wherein said intersection is defined by said heat pipes or heat pipe channels that merge through one another configured to provided in-plane heat spreading in different directions along said high thermal conductivity layer.

17. The system of claim 1, wherein:
said heat pipe system comprises one or more layers of interconnected heat pipes or interconnected heat pipe channels and one or more layers of intersecting heat pipes or intersecting heat pipe channels, wherein said interconnected heat pipes or interconnected heat pipe channels and said intersecting heat pipes or intersection heat pipe channels configured to provide in-plane heat spreading in different directions along said high thermal conductivity layer.

18. The system of claim 1, wherein:
said heat pipe system comprises one or more layers of intersecting heat pipes or heat pipe channels, wherein said intersection is defined by said heat pipes or heat pipe channels that cross over and/or under one another configured to provide heat spreading in different directions along said high thermal conductivity layer.

19. The system of claim 1, wherein:
said heat pipe system is disposed in a non-skid layer.

20. The system of claim 1, wherein:
said heat pipe system comprises radially arranged heat pipes configured to provide heat spreading in different directions along said high thermal conductivity layer.

21. The system of claim 20, wherein:
said radial-arrangement further comprises an arterial arrangement.

22. The system of claim 20, wherein:
said heat pipes are comprised of segmented pieces, wherein said segments pieces are coupled together.

23. The system of claim 1, wherein:
said heat pipe system comprises heat pipes that are comprised of segmented pieces, wherein said segment pieces that are coupled together.

24. The system of claim 1, wherein:
said heat pipe system comprises heat pipes or heat pipe channels providing one or more multi-cellular arrangements.

25. The system of claim 24, wherein said multi-cellular arrangements comprise polygonal arrangements.

26. The system of claim 1, wherein:
said low thermal conductivity layer comprises at least one or more of the following:
a uniform, low thermal conductivity material;
a non-uniform high thermal conductivity material; or
a composite formed from a multiplicity of high thermal conductivity materials.

27. The system of claim 26, wherein:
at least a portion of said low conductivity layer comprises a porous structure.

28. The system of claim 27, wherein:
said porous structure comprises pores that are filled with air, aerogels, foams, or other insulating substances.

29. The system of claim 26, wherein:
said low thermal conductivity material includes a weave structure forming a matrix.

30. The system of claim 29, wherein:
said weave structure comprises at least one of the following materials: glass or polymer fibers.

31. The system of claim 26, wherein:
said low thermal conductivity layer further comprises spaces interspersed throughout.

32. The system of claim 1, wherein:
said low thermal conductivity layer comprises an insulator.

33. The system of claim 1, wherein:
said low thermal conductivity layer, said high thermal conductivity layer, or both said low thermal conductivity layer and said high thermal conductivity layer comprises: one or more portions or segments of phase change material.

34. The system of claim 33, wherein:
said phase change material comprises at least one of the following: paraffins, fatty acids, or hydrated salts.

35. The system of claim 33, wherein:
said phase change material comprises at least one of the following: $H_2O$; $LiClO_3 \cdot 3H_2O$; $ZnCl_2 \cdot 3H_2O$; $K_2HPO_4 \cdot 6H_2O$; $NaOH \cdot 3\frac{1}{2}H_2O$; $Na_2CrO_4 \cdot 10H_2O$; $KF \cdot 4H_2O$; $Mn(NO_3)_2 \cdot 6H_2O$; $CaCl_2 \cdot 6H_2O$; $LiNO_3 \cdot 3H_2O$; $Na_2SO_4 \cdot 10H_2O$; $Na_2CO_3 \cdot 10H_2O$; $CaBr_2 \cdot 6H_2O$; $Na_2HPO_4 \cdot 12H_2O$; $Zn(NO_3)_2 \cdot 6H_2O$; $KF \cdot 2H_2O$; $K(CH_3COO) \cdot 1\frac{1}{2}H_2O$; $K_3PO_4 \cdot 7H_2O$; $Zn(NO_3)_2 \cdot 4H_2O$; $Ca(NO_3)_2 \cdot 4H_2O$; $Na_2HPO_4 \cdot 7H_2O$; $Na_2S_2O_3 \cdot 5H_2O$; $Zn(NO_3)_2 \cdot 2H_2O$; $NaOH \cdot H_2O$; $Na(CH_3COO) \cdot 3H_2O$; $Cd(NO_3)_2 \cdot 4H_2O$; $Fe(NO_3)_2 \cdot 6H_2O$; $NaOH$; $Na_2B_4O_7 \cdot 10H_2O$; $Na3PO_4 \cdot 12H_2O$; $Na_2P_2O_7 \cdot 10H_2O$; $Ba(OH)_2 \cdot 8H_2O$; $AlK(SO_4)_2 \cdot 12H_2O$; $Kal(SO_4)_2 \cdot 12H_2O$; $Al_2(SO_4)_3 \cdot 18H_2O$; $Al(NO_3)_3 \cdot 8H_2O$; $Mg(NO_3)_2 \cdot 6H_2O$; $(NH_4)Al(SO_4) \cdot 6H_2O$; $Na_2S \cdot 5\frac{1}{2}H_2O$; $CaBr_2 \cdot 4H_2O$; $Al_2(SO_4)_3 \cdot 16H_2O$; $MgCl_2 \cdot 6H_2O$; $Mg(NO_3) \cdot 2H_2O$; $NaNO_3$; $KNO_3$; $KOH$; $MgCl_2$; $NaCl$; $Na_2CO_3$; or $KF$; $K_2CO_3$.

36. The system of claim 1, further comprising:
an external layer in communication with said high thermal conductivity layer, distal from said low thermal conductivity layer.

37. The system of claim 36, wherein:
said external layer comprises a layer of non-skid material.

38. The system of claim 37, wherein:
said non-skid material is at least one of the following: polymer epoxy or metal alloy-based.

39. The system of claim 36, wherein:
said communication is provided by a thermal-spray coat or by an adhesive bond.

40. The system of claim 1, wherein:
said low thermal conductivity layer is in communication with a surface proximal to said low thermal conductivity and distal to said high thermal conductivity, wherein said surface is used for a launching and/or landing of an aircraft or a space craft.

41. The system of claim 40, wherein:
said surface is a flight deck of a water craft, sea craft, or amphibious vehicle.

42. The system of claim 40, wherein:
said surface is a landing pad, air strip, helicopter pad, space or air craft pad, or airport runway.

43. The system of claim 1, wherein:
said thermal management system comprises a single module.

44. The system of claim 1, wherein:
said thermal management system comprises multiple modules so that said thermal management system may be assembled from said multiple modules.

45. The system of claim 44, wherein:
said modules further comprise one or more interconnectors for thermally interconnecting with one another.

46. The system of claim 45, wherein:
said one or more interconnectors may comprise one or more of the following: heat pipes, couplings, attachments, or mechanical communications.

47. The system of claim 1, wherein said multiple heat pipes or heat pipe channels are disposed within a thickness dimension of said high thermal conductivity layer.

48. The system of claim 1, wherein said multiple heat pipes or heat pipe channels surrounded and enclosed by said high thermal conductivity material of said high conductivity layer surrounding define walls of said multiple heat pipes or heat pipe channels.

49. The system of claim 1, wherein said multiple heat pipes or heat pipe channels having a heat pipe wicking structure.

50. The system according to claim 1, wherein the anisotropic thermal management system is a load-bearing structure.

51. The system according to claim 50, wherein the anisotropic thermal management system is at least one selected from the group consisting of a floor, wall, ceiling, beam, truss, or other structural component or surface of a building, vehicle, ship, trailer, aircraft, watercraft, spacecraft, container, electronic housing, machinery housing, tank, pool, swimming pool, or reservoir.

\* \* \* \* \*